(12) United States Patent
Xu et al.

(10) Patent No.: US 12,580,713 B2
(45) Date of Patent: Mar. 17, 2026

(54) UPDATING BANDWIDTH PART WIDTH FROM DEFAULT CONFIGURATION

(71) Applicant: QUALCOMM Incorporated, San Diego, CA (US)

(72) Inventors: Changlong Xu, Beijing (CN); Jing Sun, San Diego, CA (US); Xiaoxia Zhang, San Diego, CA (US); Aleksandar Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 541 days.

(21) Appl. No.: 17/906,606

(22) PCT Filed: Apr. 8, 2020

(86) PCT No.: PCT/CN2020/083768
§ 371 (c)(1),
(2) Date: Sep. 16, 2022

(87) PCT Pub. No.: WO2021/203299
PCT Pub. Date: Oct. 14, 2021

(65) Prior Publication Data
US 2023/0171074 A1 Jun. 1, 2023

(51) Int. Cl.
*H04L 5/00* (2006.01)
(52) U.S. Cl.
CPC .......... *H04L 5/0092* (2013.01); *H04L 5/0053* (2013.01)
(58) Field of Classification Search
CPC ... H04L 5/0092; H04L 5/0053; H04L 5/0007; H04L 5/0098; H04W 72/0453
See application file for complete search history.

(56) References Cited

U.S. PATENT DOCUMENTS

| | | | | |
|---|---|---|---|---|
| 2018/0279289 A1* | 9/2018 | Islam | ................ | H04W 72/0446 |
| 2019/0082425 A1 | 3/2019 | Li et al. | | |

(Continued)

FOREIGN PATENT DOCUMENTS

| | | |
|---|---|---|
| CN | 110771208 A | 2/2020 |
| CN | 110839248 A | 2/2020 |

(Continued)

OTHER PUBLICATIONS

Qualcomm, "Remaining control plane issues of BWP", 3GPP TSG-RAN WG2 Meeting #100, R2-1713885 (Year: 2017).*

(Continued)

*Primary Examiner* — Ayaz R Sheikh
*Assistant Examiner* — Mang Boi Thawng
(74) *Attorney, Agent, or Firm* — Holland & Hart LLP /Qualcomm

(57) ABSTRACT

Methods, systems, and devices for wireless communications are described. A user equipment (UE) in communication with a base station may support updating a bandwidth part (BWP) width from a default configuration. The UE may identify a first BWP, where the first BWP is a default BWP for communication with the base station. The UE may receive an indication of a second BWP from the base station that is wider than the first BWP. The indication may, in some cases, be included in a remaining minimum system information (RMSI), a master information block (MIB), or the like. The UE may select, based on the received indication and an operating band of the base station, the second BWP for communications between the UE and the base station. The UE and the base station may communicate using the second BWP.

30 Claims, 17 Drawing Sheets

(56) References Cited

U.S. PATENT DOCUMENTS

| | | | | |
|---|---|---|---|---|
| 2019/0103953 A1 | | 4/2019 | Liao et al. | |
| 2019/0150121 A1* | | 5/2019 | Abdoli | H04L 5/0092 |
| | | | | 370/329 |
| 2019/0215847 A1 | | 7/2019 | Abdoli et al. | |
| 2019/0281652 A1 | | 9/2019 | Zhang et al. | |
| 2019/0305916 A1* | | 10/2019 | Liao | H04L 5/0092 |
| 2019/0357194 A1 | | 11/2019 | Hwang et al. | |
| 2020/0266959 A1* | | 8/2020 | Yi | H04J 11/00 |
| 2020/0314885 A1* | | 10/2020 | Cirik | H04L 5/0048 |
| 2020/0358586 A1* | | 11/2020 | Takeda | H04W 72/0453 |
| 2021/0168810 A1* | | 6/2021 | Chen | H04W 72/53 |
| 2023/0131118 A1* | | 4/2023 | Kim | H04W 52/0216 |
| | | | | 370/311 |
| 2023/0140310 A1* | | 5/2023 | Koskinen | H04L 5/0064 |
| | | | | 370/329 |

FOREIGN PATENT DOCUMENTS

| | | | | | |
|---|---|---|---|---|---|
| EP | 3836688 | A1 | 6/2021 | | |
| WO | 2018076218 | A1 | 5/2018 | | |
| WO | WO-2019138521 | A1 | 7/2019 | | |
| WO | WO-2020030051 | A1 | 2/2020 | | |
| WO | WO-2021031163 | A1 * | 2/2021 | | H04L 5/0092 |

OTHER PUBLICATIONS

International Search Report and Written Opinion—PCT/CN2020/083768—ISA/EPO—Dec. 30, 2020.

NTT Docomo, Inc.et al. "Bandwidth Configuration for Basic BWP Operation", 3GPP TSG-RAN WG2 #102, R2-1807390, May 25, 2018 (May 25, 2018), 3 Pages, the whole document.

Supplementary European Search Report—EP20930395—Search Authority—The Hague—Oct. 23, 2023.

* cited by examiner

BWP Configuration Information 205

200

400

500

600

Bandwidth Part Identifying Component

710

Bandwidth Part Selecting Component

720

Indication Receiving Component

715

Communication Component

725

705

700

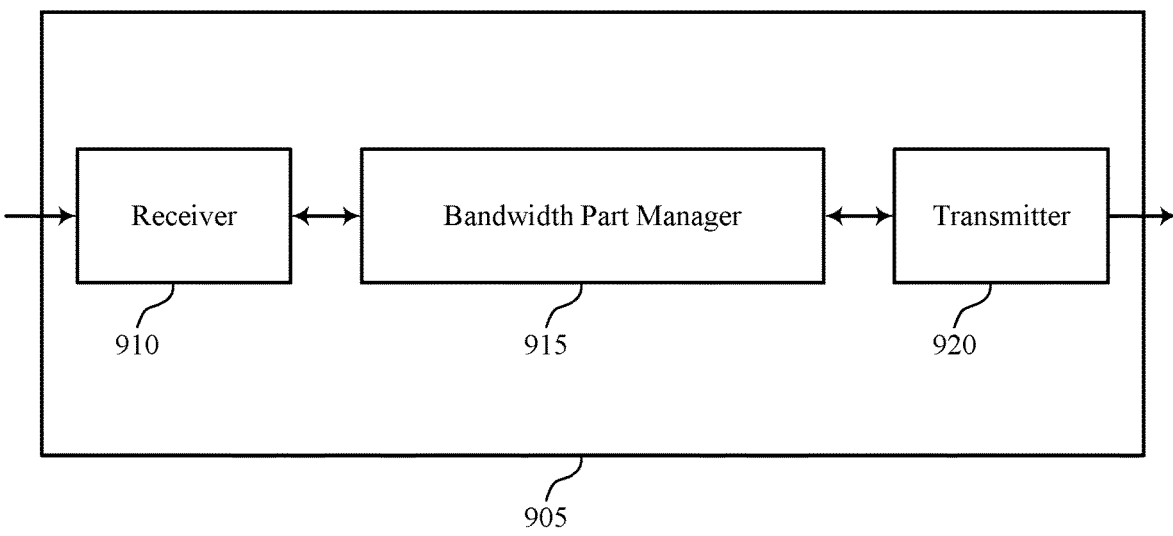
  900

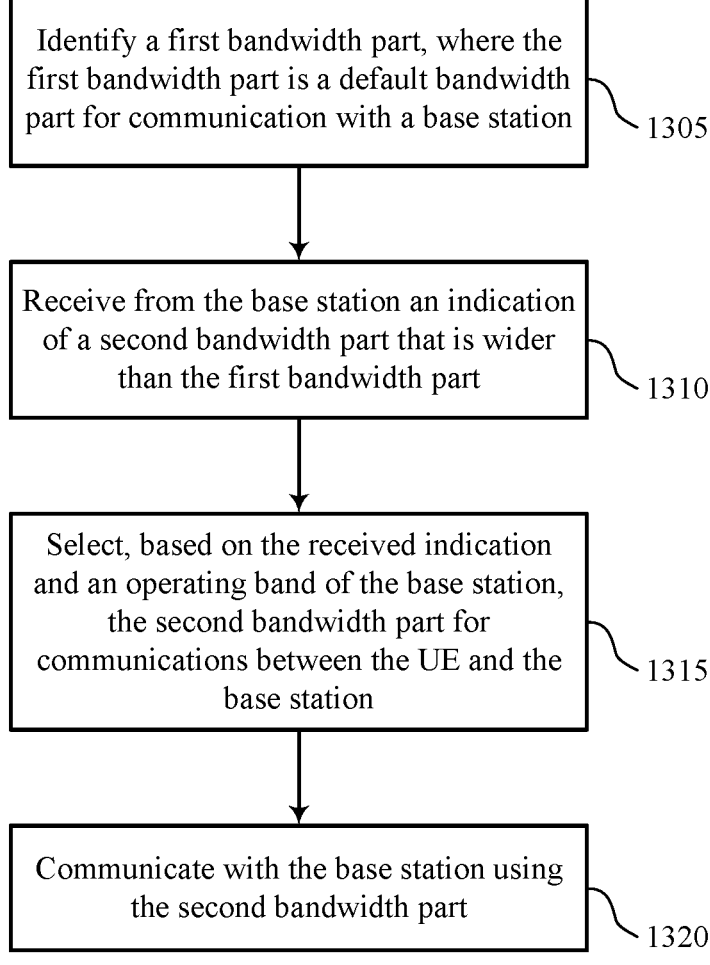

Identify a first bandwidth part, where the first bandwidth part is a default bandwidth part for communication with a base station

1305

Receive from the base station an indication of a second bandwidth part that is wider than the first bandwidth part

1310

Select, based on the received indication and an operating band of the base station, the second bandwidth part for communications between the UE and the base station

1315

Communicate with the base station using the second bandwidth part

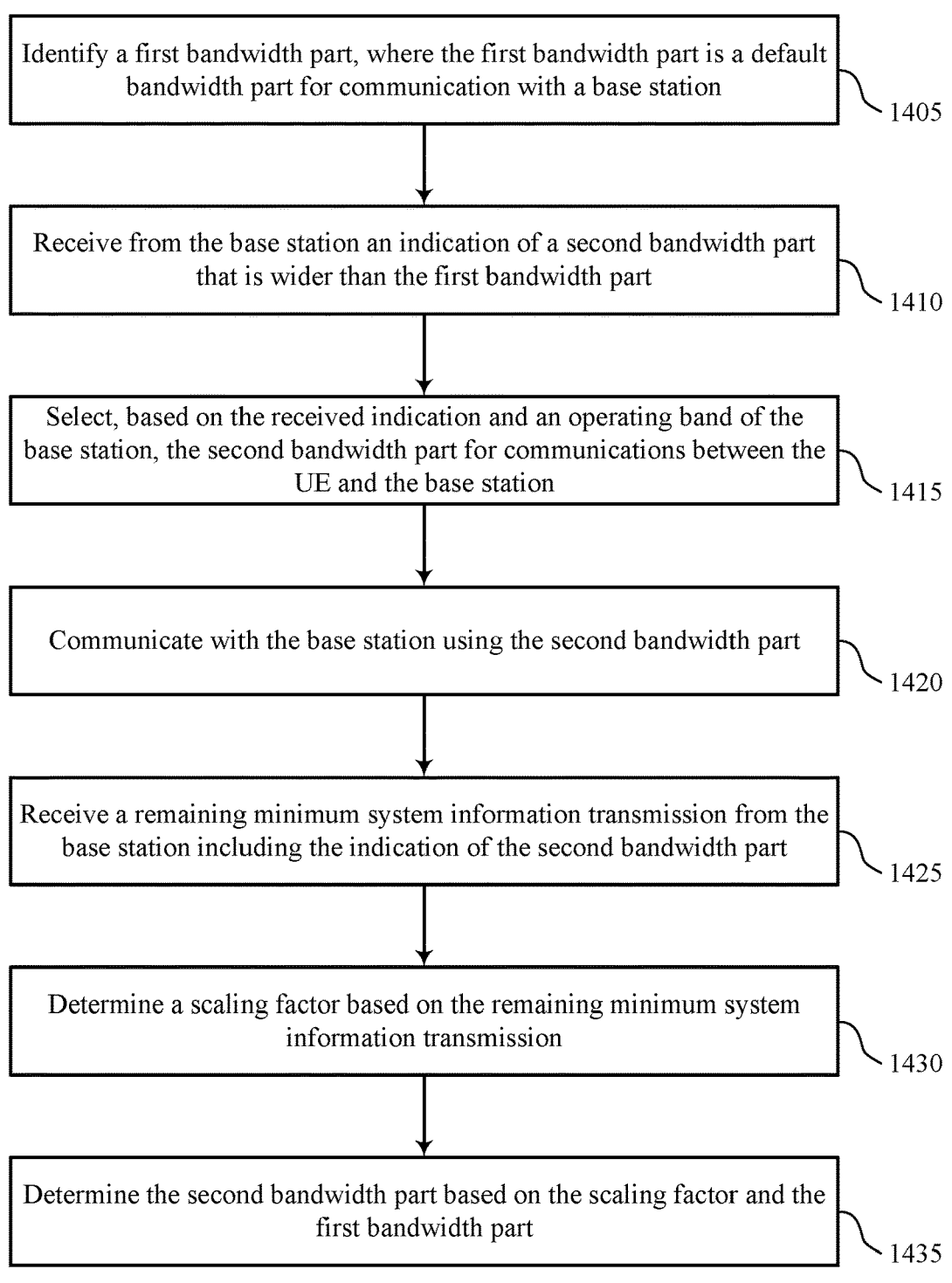

Identify a first bandwidth part, where the first bandwidth part is a default bandwidth part for communication with a base station

1405

Receive from the base station an indication of a second bandwidth part that is wider than the first bandwidth part

1410

Select, based on the received indication and an operating band of the base station, the second bandwidth part for communications between the UE and the base station

1415

Communicate with the base station using the second bandwidth part

1420

Receive a remaining minimum system information transmission from the base station including the indication of the second bandwidth part

1425

Determine a scaling factor based on the remaining minimum system information transmission

1430

Determine the second bandwidth part based on the scaling factor and the first bandwidth part

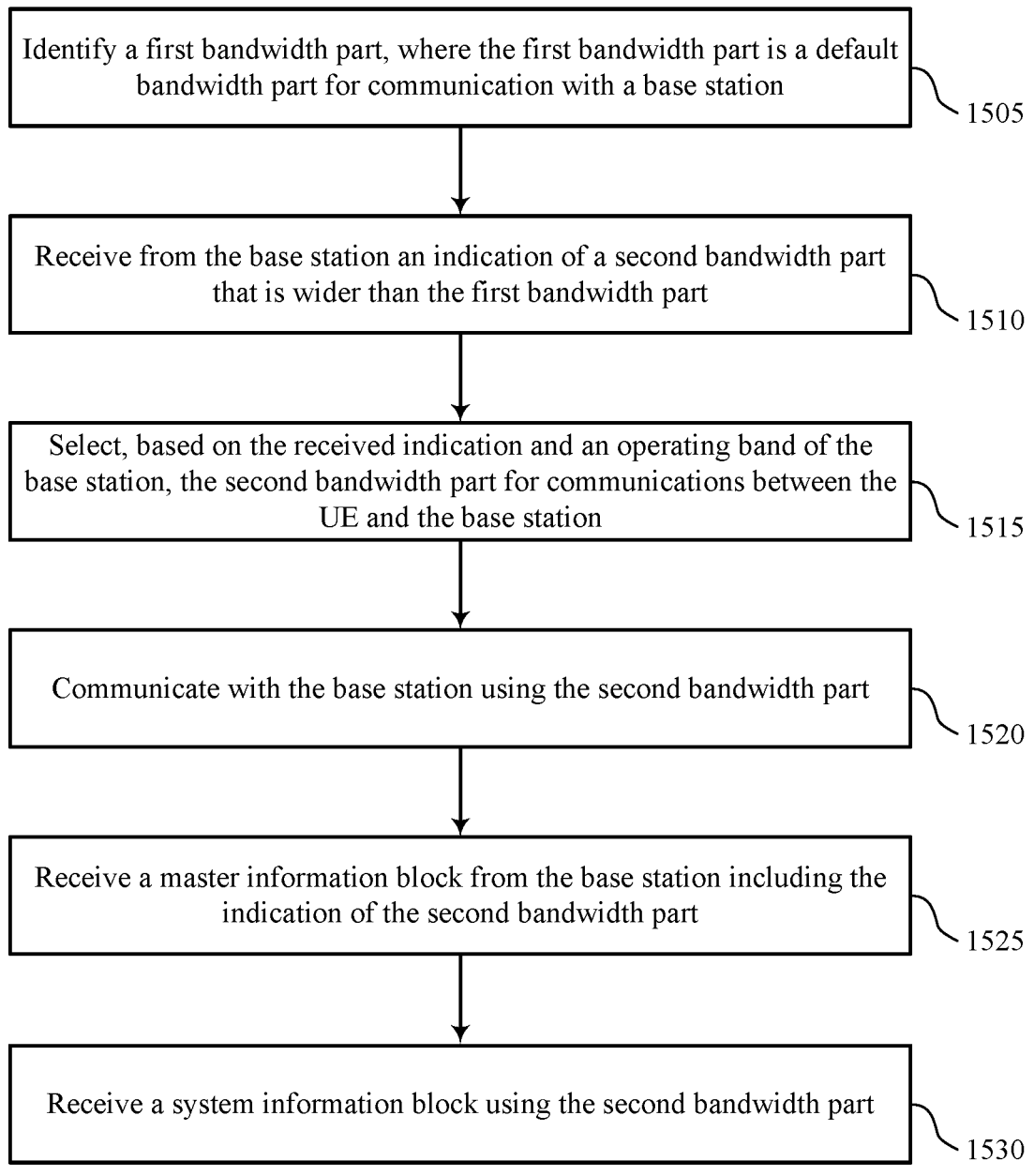

Identify a first bandwidth part, where the first bandwidth part is a default bandwidth part for communication with a base station

1505

Receive from the base station an indication of a second bandwidth part that is wider than the first bandwidth part

1510

Select, based on the received indication and an operating band of the base station, the second bandwidth part for communications between the UE and the base station

1515

Communicate with the base station using the second bandwidth part

1520

Receive a master information block from the base station including the indication of the second bandwidth part

1525

Receive a system information block using the second bandwidth part

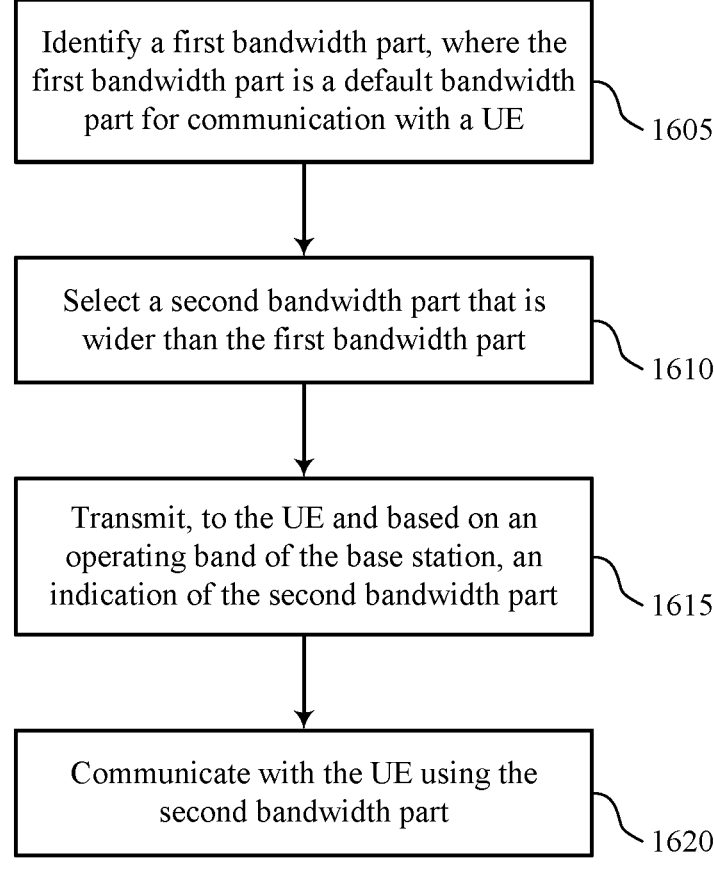

Identify a first bandwidth part, where the first bandwidth part is a default bandwidth part for communication with a UE

1605

Select a second bandwidth part that is wider than the first bandwidth part

1610

Transmit, to the UE and based on an operating band of the base station, an indication of the second bandwidth part

1615

Communicate with the UE using the second bandwidth part

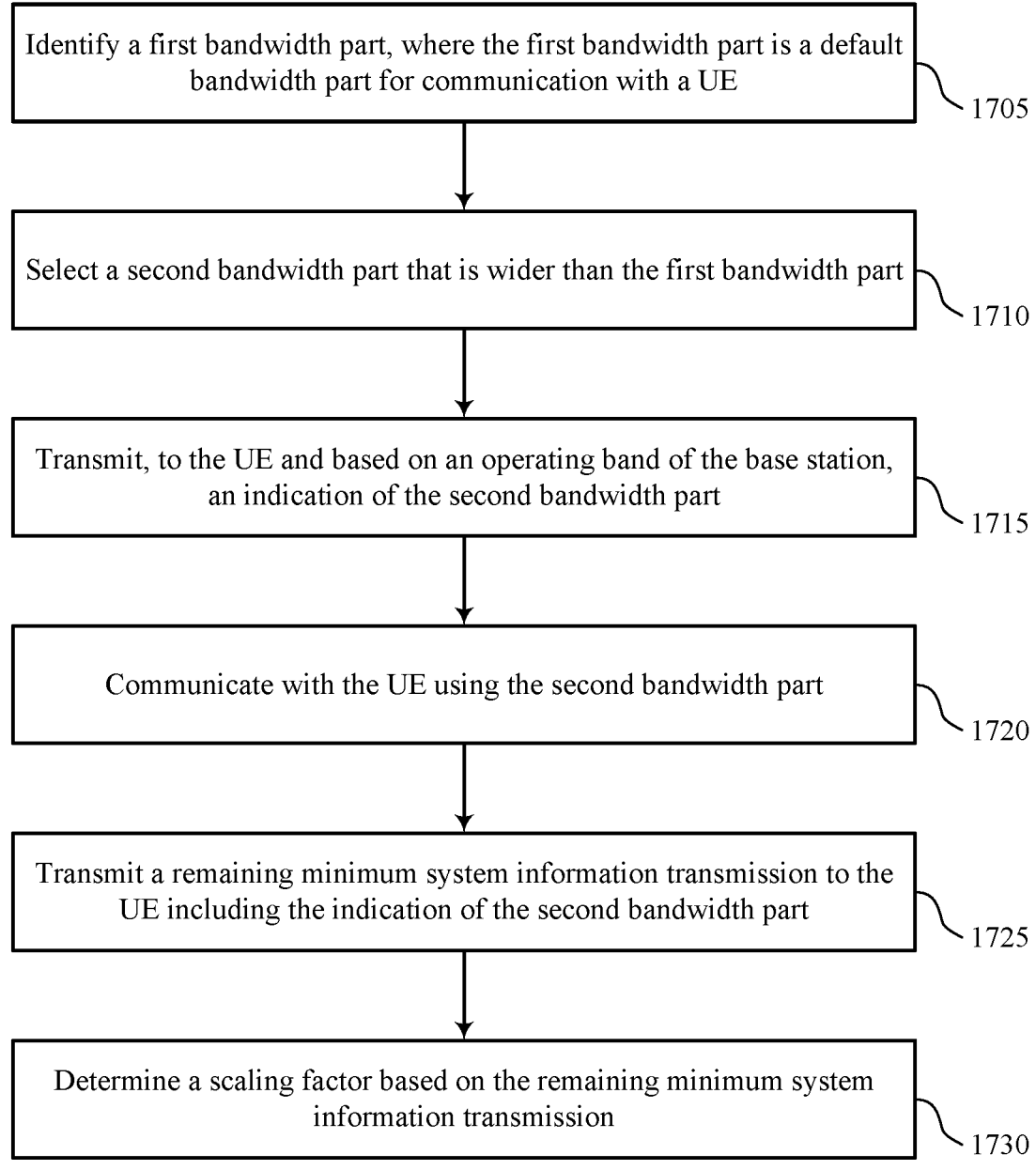
FIG. 17      1700

UPDATING BANDWIDTH PART WIDTH FROM DEFAULT CONFIGURATION

CROSS REFERENCE

The present application is a 371 national stage filing of International PCT Application No. PCT/CN2020/083768 by XU et al. entitled "UPDATING BANDWIDTH PART WIDTH FROM DEFAULT CONFIGURATION," filed Apr. 8, 2020, which is assigned to the assignee hereof, and which is expressly incorporated by reference in its entirety herein.

FIELD OF TECHNOLOGY

The following relates generally to wireless communications and more specifically to updating a bandwidth part width from a default configuration.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Devices operating in a wireless communications environment may be associated with resource thresholds or limitations that can decrease device performance and increase system interference.

SUMMARY

The described techniques relate to improved methods, systems, devices, and apparatuses that support updating a bandwidth part width from a default configuration. Generally, the described techniques provide for increasing the transmit power of a device operating in a wireless communications environment. A user equipment (UE) in communication with a base station may support updating a bandwidth part (BWP) width from a default configuration. The UE may identify a first BWP, where the first BWP is a default BWP for communication with the base station. The UE may receive an indication of a second BWP from the base station that is wider than the first BWP, and the indication may be included in a remaining minimum system information (RMSI) or a master information block (MIB). The UE may select, based on the received indication and an operating band of the base station, the second BWP for communications between the UE and the base station. The UE and the base station may communicate using the second BWP.

A method of wireless communication at a UE is described. The method may include identifying a first bandwidth part, where the first bandwidth part is a default bandwidth part for communication with a base station, receiving from the base station an indication of a second bandwidth part that is wider than the first bandwidth part, selecting, based on the received indication and an operating band of the base station, the second bandwidth part for communications between the UE and the base station, and communicating with the base station using the second bandwidth part.

An apparatus for wireless communication at a UE is described. The apparatus may include a processor, memory coupled with the processor, and instructions stored in the memory. The instructions may be executable by the processor to cause the apparatus to identify a first bandwidth part, where the first bandwidth part is a default bandwidth part for communication with a base station, receive from the base station an indication of a second bandwidth part that is wider than the first bandwidth part, select, based on the received indication and an operating band of the base station, the second bandwidth part for communications between the UE and the base station, and communicate with the base station using the second bandwidth part.

Another apparatus for wireless communication at a UE is described. The apparatus may include means for identifying a first bandwidth part, where the first bandwidth part is a default bandwidth part for communication with a base station, receiving from the base station an indication of a second bandwidth part that is wider than the first bandwidth part, selecting, based on the received indication and an operating band of the base station, the second bandwidth part for communications between the UE and the base station, and communicating with the base station using the second bandwidth part.

A non-transitory computer-readable medium storing code for wireless communication at a UE is described. The code may include instructions executable by a processor to identify a first bandwidth part, where the first bandwidth part is a default bandwidth part for communication with a base station, receive from the base station an indication of a second bandwidth part that is wider than the first bandwidth part, select, based on the received indication and an operating band of the base station, the second bandwidth part for communications between the UE and the base station, and communicate with the base station using the second bandwidth part.

In some examples of the method, apparatuses, and non-transitory computer-readable medium described herein, receiving the indication of the second bandwidth part may include operations, features, means, or instructions for receiving a remaining minimum system information transmission from the base station including the indication of the second bandwidth part.

Some examples of the method, apparatuses, and non-transitory computer-readable medium described herein may further include operations, features, means, or instructions for determining a scaling factor based on the remaining minimum system information transmission, and where selecting the second bandwidth part includes determining the second bandwidth part based on the scaling factor and the first bandwidth part.

In some examples of the method, apparatuses, and non-transitory computer-readable medium described herein, a center frequency of the first bandwidth part may be aligned with a center frequency of the second bandwidth part.

In some examples of the method, apparatuses, and non-transitory computer-readable medium described herein, a width of the second bandwidth part may be an odd multiple of a width of the first bandwidth part.

In some examples of the method, apparatuses, and non-transitory computer-readable medium described herein, the second bandwidth part may include an uplink bandwidth part, a downlink bandwidth part, or a combination thereof.

In some examples of the method, apparatuses, and non-transitory computer-readable medium described herein, receiving the indication of the second bandwidth part may include operations, features, means, or instructions for receiving a master information block from the base station including the indication of the second bandwidth part.

In some examples of the method, apparatuses, and non-transitory computer-readable medium described herein, the indication of the second bandwidth part includes a control resource set bandwidth field indicating a control resource set bandwidth that may be wider than the first bandwidth part.

In some examples of the method, apparatuses, and non-transitory computer-readable medium described herein, communicating with the base station using the second bandwidth part may include operations, features, means, or instructions for receiving a system information block using the second bandwidth part.

In some examples of the method, apparatuses, and non-transitory computer-readable medium described herein, the operating band of the base station includes a 6 GHz band.

A method of wireless communication at a base station is described. The method may include identifying a first bandwidth part, where the first bandwidth part is a default bandwidth part for communication with a UE, selecting a second bandwidth part that is wider than the first bandwidth part, transmitting, to the UE and based on an operating band of the base station, an indication of the second bandwidth part, and communicating with the UE using the second bandwidth part.

An apparatus for wireless communication at a base station is described. The apparatus may include a processor, memory coupled with the processor, and instructions stored in the memory. The instructions may be executable by the processor to cause the apparatus to identify a first bandwidth part, where the first bandwidth part is a default bandwidth part for communication with a UE, select a second bandwidth part that is wider than the first bandwidth part, transmit, to the UE and based on an operating band of the base station, an indication of the second bandwidth part, and communicate with the UE using the second bandwidth part.

Another apparatus for wireless communication at a base station is described. The apparatus may include means for identifying a first bandwidth part, where the first bandwidth part is a default bandwidth part for communication with a UE, selecting a second bandwidth part that is wider than the first bandwidth part, transmitting, to the UE and based on an operating band of the base station, an indication of the second bandwidth part, and communicating with the UE using the second bandwidth part.

A non-transitory computer-readable medium storing code for wireless communication at a base station is described. The code may include instructions executable by a processor to identify a first bandwidth part, where the first bandwidth part is a default bandwidth part for communication with a UE, select a second bandwidth part that is wider than the first bandwidth part, transmit, to the UE and based on an operating band of the base station, an indication of the second bandwidth part, and communicate with the UE using the second bandwidth part.

In some examples of the method, apparatuses, and non-transitory computer-readable medium described herein, transmitting the indication of the second bandwidth part may include operations, features, means, or instructions for transmitting a remaining minimum system information transmission to the UE including the indication of the second bandwidth part.

Some examples of the method, apparatuses, and non-transitory computer-readable medium described herein may further include operations, features, means, or instructions for determining a scaling factor based on the remaining minimum system information transmission, and where selecting the second bandwidth part includes determining the second bandwidth part based on the scaling factor and the first bandwidth part.

In some examples of the method, apparatuses, and non-transitory computer-readable medium described herein, a center frequency of the first bandwidth part may be aligned with a center frequency of the second bandwidth part.

In some examples of the method, apparatuses, and non-transitory computer-readable medium described herein, a width of the second bandwidth part may be an odd multiple of a width of the first bandwidth part.

In some examples of the method, apparatuses, and non-transitory computer-readable medium described herein, the second bandwidth part may include an uplink bandwidth part, a downlink bandwidth part, or a combination thereof.

In some examples of the method, apparatuses, and non-transitory computer-readable medium described herein, transmitting the indication of the second bandwidth part may include operations, features, means, or instructions for transmitting a master information block to the UE including the indication of the second bandwidth part.

In some examples of the method, apparatuses, and non-transitory computer-readable medium described herein, the indication of the second bandwidth part includes a control resource set bandwidth field indicating a control resource set bandwidth that may be wider than the first bandwidth part.

In some examples of the method, apparatuses, and non-transitory computer-readable medium described herein, communicating with the UE using the second bandwidth part may include operations, features, means, or instructions for transmitting a system information block using the second bandwidth part.

In some examples of the method, apparatuses, and non-transitory computer-readable medium described herein, the operating band of the base station includes a 6 GHz band.

BRIEF DESCRIPTION OF THE DRAWINGS

FIGS. 13 through 17 show flowcharts illustrating methods that support updating a bandwidth part width from a default configuration in accordance with aspects of the present disclosure.

DETAILED DESCRIPTION

Figure 1:
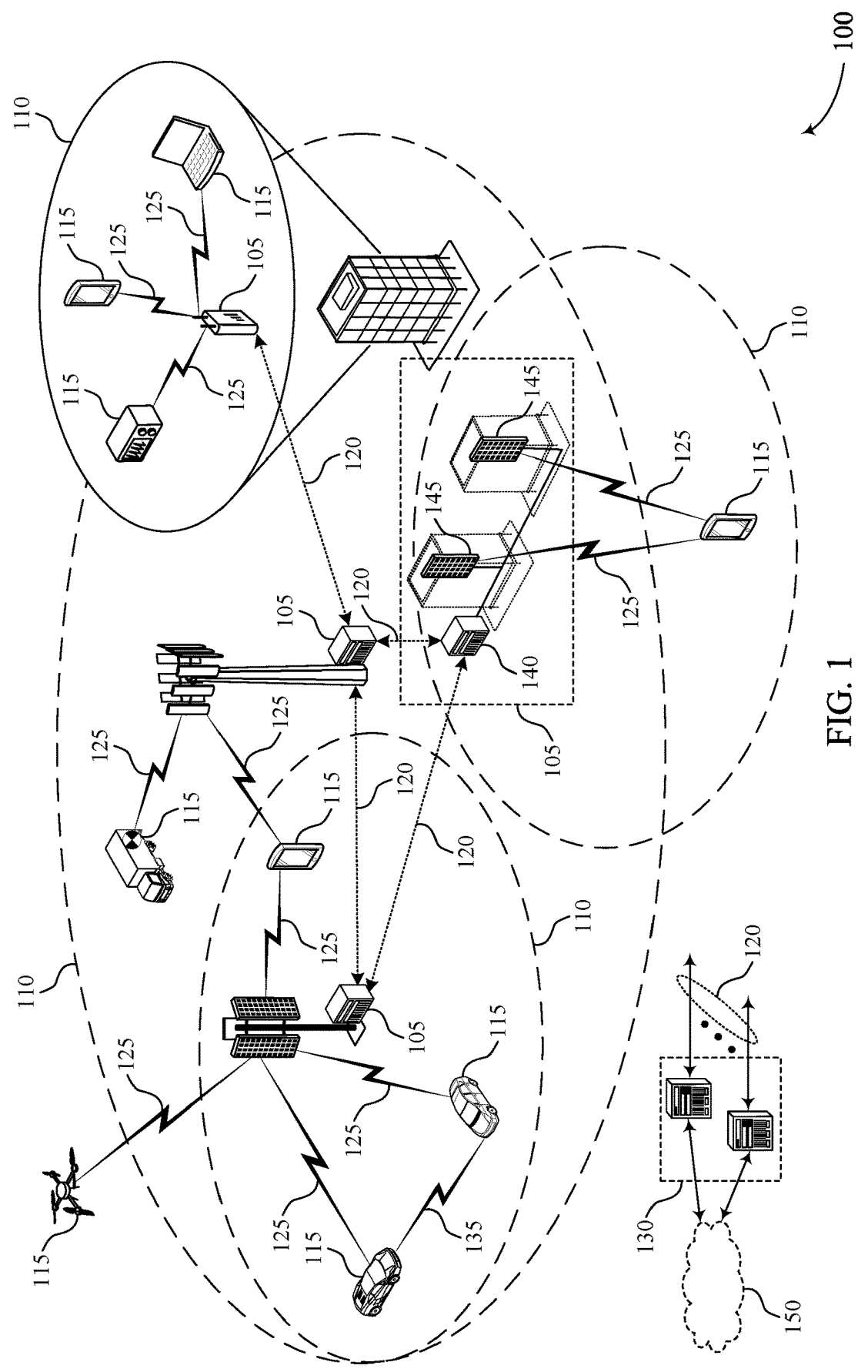
FIG. 1 illustrates an example of a system for wireless communications that supports updating a bandwidth part width from a default configuration in accordance with aspects of the present disclosure.

Wireless communications systems are widely deployed to provide various types of communication content such as voice, video, packet data, messaging, broadcast, and so on. These systems may be capable of supporting multiple devices and communication directions. Devices operating in a wireless communications system may operate under or be associated with a default bandwidth part (BWP) and a power spectral density (PSD) threshold or limitation. In some cases, a device and/or a communication direction may be associated with a default BWP and a PSD limitation. The default BWP may have a default BWP width, and the PSD may be associated with a transmit power per megahertz (MHz) limitation. For example, a base station may operate under a first PSD threshold (e.g., 5 decibel-milliwatt (dBm) per MHz), and a user equipment (UE) may operate under a second PSD threshold (e.g., −1 dBm per MHz). In some additional or alternative examples, the base station may operate within a first default BWP (e.g., 20 MHz), and the UE may operate within a second default BWP (e.g., 20 MHz). In some cases, the PSD limitation, the width of the BWP, or a combination thereof may be associated with a decrease in transmit power and/or an increase in transmission interference. A UE operating in a 6 GHz spectrum band may operate in accordance with a PSD threshold and be configured with a default initial BWP (e.g., a default initial uplink BWP, a default initial downlink BWP, etc.). In some cases, a narrow default initial BWP (e.g., 20 GHz) paired with a PSD threshold (e.g., −1 dBm per MHz) may result in a lower overall transmit power and a greater susceptibility to interference.

According to aspects described herein, a UE may communicate with a base station based on a second BWP to increase transmit power and/or reduce transmission interference. The second BWP may be wider than a first BWP (e.g., a default BWP, an initial BWP, etc.), which may increase transmit power and/or decrease transmission interference. In some examples, the second BWP may be based on the first BWP, a scaling factor, or a combination thereof. In some additional or alternative examples, the center frequency of the first BWP and the center frequency of the second BWP may be aligned. For example, the first BWP may correspond to a default downlink BWP, the second BWP may correspond to an initial uplink BWP, and the width of the second BWP may correspond to an odd multiple of the width of the first BWP. As an additional or alternative example, the first BWP may correspond to an initial downlink BWP, the second BWP may correspond to an initial uplink BWP, and the width of the initial downlink BWP as well as the width of the initial uplink BWP may be based on a scaling of a default BWP.

The UE may receive an indication of the second BWP from the base station. The indication may be received in a system information block (SIB), a remaining minimum system information (RMSI), a physical downlink shared channel (PDSCH), a master information block (MIB), a synchronization signal block (SSB), or the like. The UE may select the second BWP based on the received indication and/or an operating band of the base station. In some examples, the UE and the base station may communicate based on the second BWP. For example, the base station may transmit PDSCH data based on the second BWP, and the UE may receive the PDSCH data based on the second BWP. In some additional or alternative examples, the base station may transmit a control resource set (CORESET), a physical downlink control channel (PDCCH), a downlink control information (DCI), or any combination thereof based on the second BWP. In some examples, a resource band (e.g., a 6 GHz resource band) may be associated with power restrictions (e.g., a PSD limit), and operating or communicating based on a second BWP (e.g., a wide BWP) may improve transmit power and reduce transmission interference.

Aspects of the disclosure are initially described in the context of wireless communications systems. Aspects are then described with respect to an additional wireless communications system, a number of bandwidth part configuration systems, and a process flow. Aspects of the disclosure are further illustrated by and described with reference to apparatus diagrams, system diagrams, and flowcharts that relate to updating a bandwidth part width from a default configuration.

FIG. 1 illustrates an example of a wireless communications system 100 that supports updating a bandwidth part width from a default configuration in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORE-SET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The network operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

According to some aspects, a UE 115 may support updating a BWP width from a default configuration. The UE 115 may identify a first BWP, where the first BWP is a default BWP for communication with a base station 105. The UE 115 may receive an indication of a second BWP that is wider than the first BWP from the base station 105 and select, based on the received indication and an operating band of the base station 105, the second BWP for communications with the base station 105. In some cases, base station 105 may transmit the indication in an RMSI or a MIB. Communicating based on the second BWP (e.g., the updated BWP) may increase transmit power and reduce transmission interference.

Figure 2:
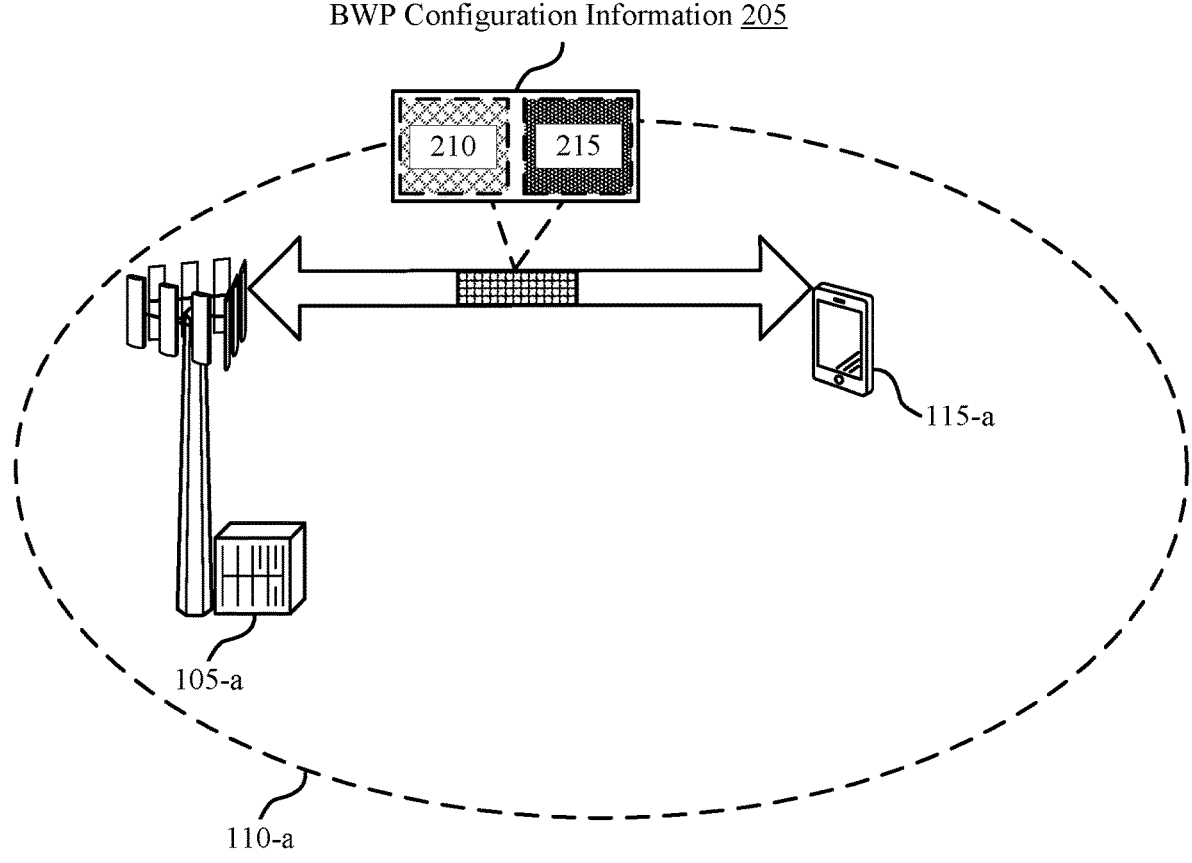
FIG. 2 illustrates an example of a wireless communications system that supports updating a bandwidth part width from a default configuration in accordance with aspects of the present disclosure.

FIG. 2 illustrates an example of a wireless communications system 200 that supports updating a bandwidth part width from a default configuration in accordance with aspects of the present disclosure. In some examples, the wireless communications system 200 may implement aspects of wireless communication system 100. The wireless communications system 200 may include base station 105-*a* and UE 115-*a*. Generally, the wireless communications system 200 illustrates an example where base station 105-*a* may transmit the BWP configuration information 205 to UE 115-*a*.

In some cases, a wireless communications system may operate in a band that has relatively strict PSD requirements. In such cases, operating in a relatively narrow default BWP may be associated with a lower transmit power than would be used for the same bandwidth part in a band with less stringent PSD requirements. This lower transmit power may in turn reduce the signal quality between base station 105-*a* and UE 115-*a*, making the link between base station 105-*a* and UE 115-*a* more prone to interference. A default BWP may be specified by technology standard or a regulatory body, and devices may be configured to operate based on the default BWP. In some cases, increasing the width of a BWP may increase transmit power while maintaining compliance with the PSD constraints, thereby improving the quality of the link between UE 115-*a* and base station 105-*a*.

In one example, UE 115-*a* may communicate with base station 105-*a* and UE 115-*a* and/or base station 105-*a* may operate in a 6 GHz spectrum band, and the spectrum band may be associated with a number of PSD limitations or thresholds. In some case, one or more of the PSD limitations may be lower than a PSD limitation associated with other spectrum bands (e.g., the 5 GHz spectrum band). A device (e.g., user device 115-*a*, base station 105-*a*) may be associated with a default BWP (e.g., 20 MHz), and the device's transmit power may be limited by the width of the default BWP. Techniques are described herein for increasing the width of a BWP, thereby improving transmit power and reducing interference.

In some cases, UE 115-*a* may identify a first BWP, and the first BWP may be a default BWP for communication with base station 105-*a*. The default BWP may be based on a spectrum band, technical documentation, or technical standards, or the like. UE 115-*a* may receive an indication (e.g., BWP configuration information 205) of a second BWP that is wider than the first BWP from base station 105-*a* and select the second BWP based on the received indication. The indication may include a first transmission 210 (e.g., an RMSI, an SIB1, a PDSCH, etc.) and/or a second transmission 215 (e.g., an MIB, an SSB, etc.). An RMSI may be received by UE 115-*a* over a PDSCH, and the RMSI may contain additional system information that is not included an MIB or an SIB. In some examples, the received indication may include a scaling factor and/or one or more of a number of resource blocks (RBs), a number of symbols, or an RB offset. For example, the first transmission 210 may indicate one or more scaling factors, and UE 115-*a* may select a width of the second BWP based on the one or more scaling factors, the width of the first BWP, of a combination thereof. In some additional or alternative cases, the second transmission 215 may indicate one or more configurations of RBs, symbols, or an RB offset, and UE 115-*a* may select a width of the second BWP based on the one or more configurations. UE 115-*a* may select a second BWP with a center frequency that is aligned the center frequency of the first BWP. Selecting a second BWP with a center frequency that aligns with the center frequency of the first BWP may reduce errors and increase system compatibility.

Figures 3A, 3B, 3C:
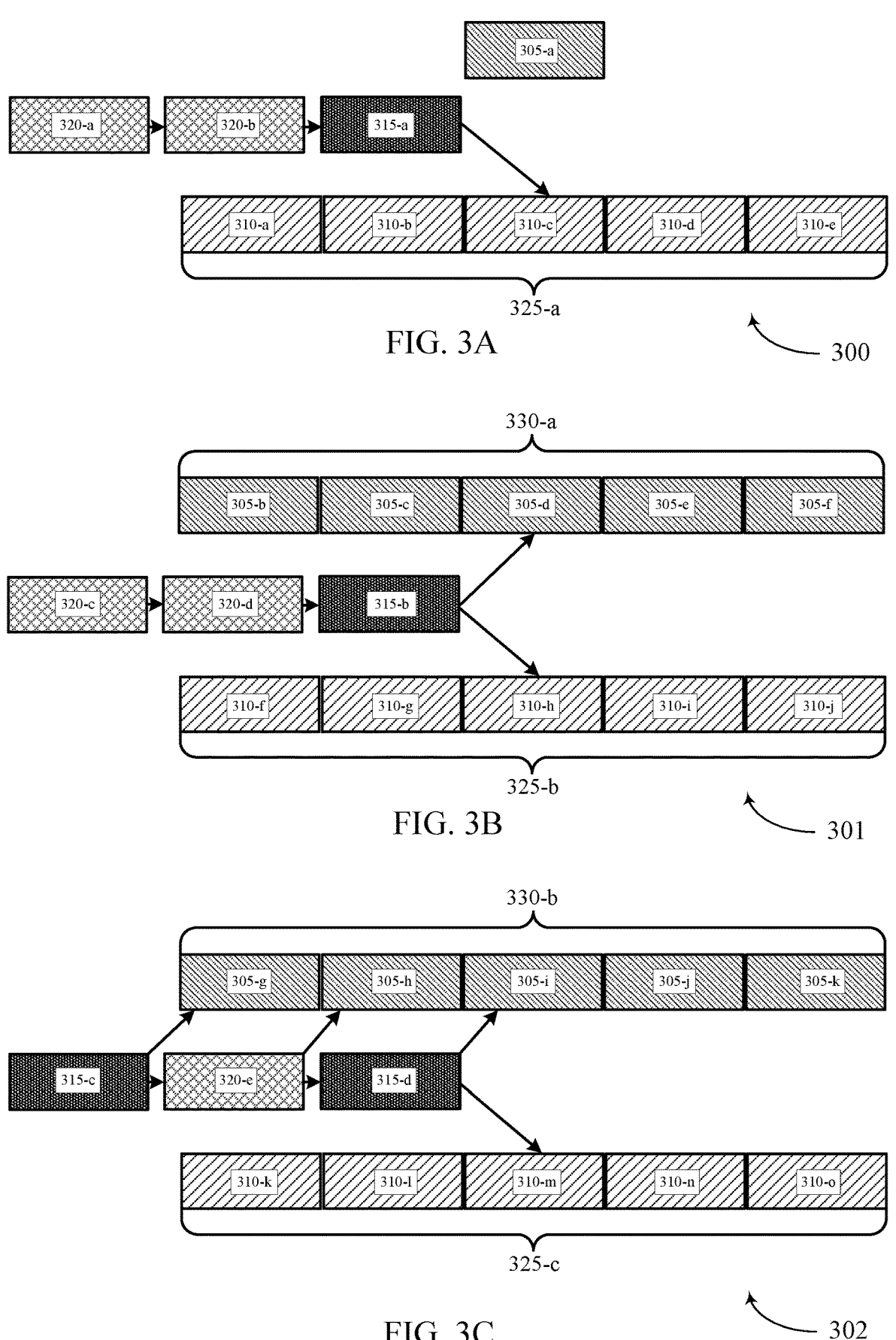
FIGS. 3A, 3B, and 3C illustrate examples of bandwidth part configuration techniques that support updating a bandwidth part width from a default configuration in accordance with aspects of the present disclosure.

FIGS. 3A, 3B, and 3C illustrate examples of bandwidth part configuration techniques that support updating a bandwidth part width from a default configuration in accordance with aspects of the present disclosure. In some examples, a bandwidth part configuration system 301, 302, or 303 may implement aspects of wireless communication system 100. In some cases, a UE may be configured with a width (e.g., 20 MHz) for a default downlink BWP and/or a default uplink BWP, and the UE may communicate with a base station using the default BWPs unless one or both of the BWPs are reconfigured by system information received from the base station. For example, a UE 115 may receive a transmission 315 and a transmission 320 from a base station 105, and the UE 115 may select an initial uplink BWP 325 and/or an initial downlink BWP 330 based on the received transmissions.

FIG. 3A illustrates an example of a bandwidth part configuration technique 300 that supports configuring initial uplink BWP 325-*a* to be different from a default initial uplink BWP. The width of initial uplink BWP 325-*a* may be larger than the width of default initial downlink BWP 305-*a*. In some examples, the width of initial uplink BWP 325-*a* (e.g., the combined width of 310-*a*, 310-*b*, 310-*c*, 300-*d*, and 310-*e*) may be an odd multiple of the width of default initial downlink BWP 305-*a*, and the center frequency of default initial downlink BWP 305-*a* may align with the center frequency of initial uplink BWP 325-*a*, which may reduce or prevent system errors.

In some cases, a UE may receive transmission 320-*a* containing an SSB that includes an MIB and/or an SIB. The UE may identify a CORESET 0 based on the MIB, and the UE may receive transmission 320-*b* containing a PDCCH DCI. The DCI may include a downlink grant for the UE, and the UE may receive transmission 315-*a* containing an RMSI based on the downlink grant. For example, the UE may receive transmission 315-*a* over a PDSCH using resources indicated in the DCI, and transmission 315-*a* may contain an RMSI signaling a change from a default initial uplink BWP to initial uplink BWP 325-*a*. In some examples, the width of initial uplink BWP 325-*a* may be based on the RMSI of transmission 315-*a*, and initial uplink BWP 325-*a* may be wider than default initial downlink BWP 305-*a*. In some additional or alternative examples, the width of initial uplink BWP 325-*a* may be signaled as a scaling factor (e.g., M), where the reconfigured width of initial uplink BWP 325-*a* is determined by the formula (2M+1)×default downlink BWP size. Signaling a scaling factor may work when default initial downlink BWP 305-*a* and initial uplink BWP 325-*a* share a center frequency, and when the reconfigured width of initial uplink BWP 325-*a* is an odd multiple of default initial downlink BWP 305-*a*. For example, if the width of default initial downlink 305-*a* is 20 MHz, the initial uplink BWP 325-*a* may be reconfigured to 60 MHz by signaling a scaling factor of M=3 in an RMSI of transmission 325-*a*.

FIG. 3B illustrates an example of a bandwidth part configuration technique 301 that supports configuring an initial uplink BWP 325-*b* to be different from a default initial uplink BWP and configuring an initial downlink BWP 330-*a* to be different from a default initial downlink BWP. The width of initial downlink BWP 330-*a* may be larger than the width of the default initial downlink BWP, and the width of initial uplink BWP 325-*b* may be larger than the width of the default initial uplink BWP. In some examples, the width of both initial downlink BWP 330-*a* (e.g., the combined width of 305-*b*, 305-*c*, 305-*d*, 305-*e*, and 305-*f*) and initial uplink BWP 325-*b* (e.g., the combined width of 310-*f*, 310-*g*, 310-*h*, 310-*i*, and 310-*j*) may be a multiple of the width of a default initial BWP, and the center frequency of initial downlink BWP 330-*a* may align with the center frequency of initial uplink BWP 325-*b*.

In some cases, a UE may receive transmission 320-*c* containing an SSB that includes an MIB and/or an SIB. The UE may identify a CORESET 0 based on the MIB, and the UE may receive transmission 320-*d* containing a PDCCH DCI. The DCI may include a downlink grant for the UE, and the UE may receive transmission 315-*b* containing an RMSI based on the downlink grant. For example, the UE may receive transmission 315-*b* over PDSCH using resources indicated in the DCI, and transmission 315-*b* may contain an RMSI signaling a change from a default initial uplink BWP to initial uplink BWP 325-*b* and/or a change from a default initial downlink BWP to initial downlink BWP 330-*a*. In some examples, the width of initial uplink BWP 325-*b* and the width of initial downlink BWP 330-*a* may be based on the RMSI of transmission 315-*b*, and initial uplink BWP 325-*b* may be wider than the default initial uplink BWP, while initial downlink BWP 330-*a* may be wider than the default initial downlink BWP. In some additional or alternative examples, the width of initial uplink BWP 325-*b* may be signaled as a scaling factor (e.g., M), where the reconfigured width of initial uplink BWP 325-*b* is determined by the formula (M)×default initial uplink BWP size. The width of initial downlink BWP 330-*a* may be signaled as a scaling factor (e.g., N), where the reconfigured width of initial downlink BWP 330-*a* is determined by the formula (N)× default initial downlink BWP size. In some cases, the scaling factors M and N may be the same, while in other cases they may be different.

FIG. 3C illustrates an example of a bandwidth part configuration technique 302 that supports configuring initial downlink BWP 330-*b* by indicating a wider CORESET 0 in an MIB (e.g., an MIB included in transmission 315-*c*). FIG. 3C additionally supports configuring an initial uplink BWP 325-*c* based on an RMSI included in transmission 315-*d*.

In some cases, a UE may receive transmission 315-*c* containing an SSB that includes an MIB and/or an SIB. In some cases, the MIB may indicate a bandwidth for a CORESET 0 that is wider than a default downlink initial BWP, and the UE may identify a CORESET 0 based on the bandwidth and/or the MIB. The UE may additionally receive transmission 320-*e* containing a PDCCH DCI based on the bandwidth. In some cases, the width of initial downlink BWP 330-*b* (e.g., the combined width of 305-*g*, 305-*h*, 305-*i*, 305-*j*, 305-*k*) may be the same as the width of the bandwidth for the CORESET 0. In some additional or alternative cases, an RMSI included in transmission 315-*d* may contain an indication of a bandwidth for initial uplink BWP 325-*c*. The width of the initial uplink BWP 325-*c* (e.g., the combined width of 310-*k*, 310-*l*, 310-*m*, 310-*n*, and 310-*o*) may be based on the RMSI of transmission 315-*d*. The width of initial downlink BWP 330-*b* may remain as the width indicated in the MIB, or the width of initial downlink BWP 330-*b* may be altered by the RMSI.

In some examples, the MIB may contain 8 reserved entries that may reconfigure a CORESET 0 bandwidth by indicating a combination of a number of RBs, a number of symbols, or an offset (e.g., an RB offset). In some cases, the MIB may include a number of entries (e.g., 8 entries) or configurations. Some configurations may include limiting the subband offset from the SSB to CORESET 0 (e.g., SSB is the lowest subband of CORESET 0), limiting the RB offsets (e.g., limiting what is supported from single subband CORESET 0), limiting the number of symbols in the CORE-SET (e.g., 2 symbols for improved coverage), etc.

Table 1 illustrates an example for a subcarrier spacing (SCS) of 30 KHz. The 8 reserved entries (e.g., the rows at indicies 8-15) may show configurations for the 2×20 MHz bandwidth and the 4×20 MHz bandwidth with 1 or 2 OFDM symbols and a subset of offsets (e.g., 1 and 3) for 30 KHz SCS. Table 1 may illustrate the set of RBs and slot symbols of CORESET for Type0-PDCCH search space set when {SS/PBCH block, PDCCH} SCS is {30, 30} KHz.

TABLE 1

| Index | SS/PBCH block and CORESET multiplexing pattern | Number of RBs N CORESET RB | Number of Symbols N CORESET symb | Offset (RBs) |
|---|---|---|---|---|
| 0 | 1 | 48 | 1 | 0 |
| 1 | 1 | 48 | 1 | 1 |
| 2 | 1 | 48 | 1 | 2 |
| 3 | 1 | 48 | 1 | 3 |
| 4 | 1 | 48 | 2 | 0 |
| 5 | 1 | 48 | 2 | 1 |
| 6 | 1 | 48 | 2 | 2 |
| 7 | 1 | 48 | 2 | 3 |
| 8 | 1 | 2 × 48 | 1 | 0 |
| 9 | 1 | 2 × 48 | 1 | 2 |
| 10 | 1 | 2 × 48 | 2 | 0 |
| 11 | 1 | 2 × 48 | 2 | 2 |
| 12 | 1 | 4 × 48 | 1 | 0 |
| 13 | 1 | 4 × 48 | 1 | 2 |
| 14 | 1 | 4 × 48 | 2 | 0 |
| 15 | 1 | 4 × 48 | 2 | 2 |

Table 2 is an example for an SCS of 15 KHz. The 8 reserved entries (e.g., the rows at indicies 8-15) may show configurations for the 2×20 MHz bandwidth and the 4×20 MHz bandwidth with 1 or 2 OFDM symbols and a subset of offsets (e.g., 12 and 16) for 15 KHz SCS. Table 2 may illustrate the set of RBs and slot symbols of CORESET for Type0-PDCCH search space set when {SS/PBCH block, PDCCH} SCS is {15, 15} KHz.

TABLE 2

| Index | SS/PBCH block and CORESET multiplexing pattern | Number of RBs N CORESET RB | Number of Symbols N CORESET symb | Offset (RBs) |
|---|---|---|---|---|
| 0 | 1 | 96 | 1 | 10 |
| 1 | 1 | 96 | 1 | 12 |
| 2 | 1 | 96 | 1 | 14 |
| 3 | 1 | 96 | 1 | 16 |
| 4 | 1 | 96 | 2 | 10 |
| 5 | 1 | 96 | 2 | 12 |
| 6 | 1 | 96 | 2 | 14 |
| 7 | 1 | 96 | 2 | 16 |
| 8 | 1 | 2 × 96 | 1 | 10 |
| 9 | 1 | 2 × 96 | 1 | 14 |
| 10 | 1 | 2 × 96 | 2 | 10 |
| 11 | 1 | 2 × 96 | 2 | 14 |
| 12 | 1 | 4 × 96 | 1 | 10 |
| 13 | 1 | 4 × 96 | 1 | 14 |
| 14 | 1 | 4 × 96 | 2 | 10 |
| 15 | 1 | 4 × 96 | 2 | 14 |

Figure 4:
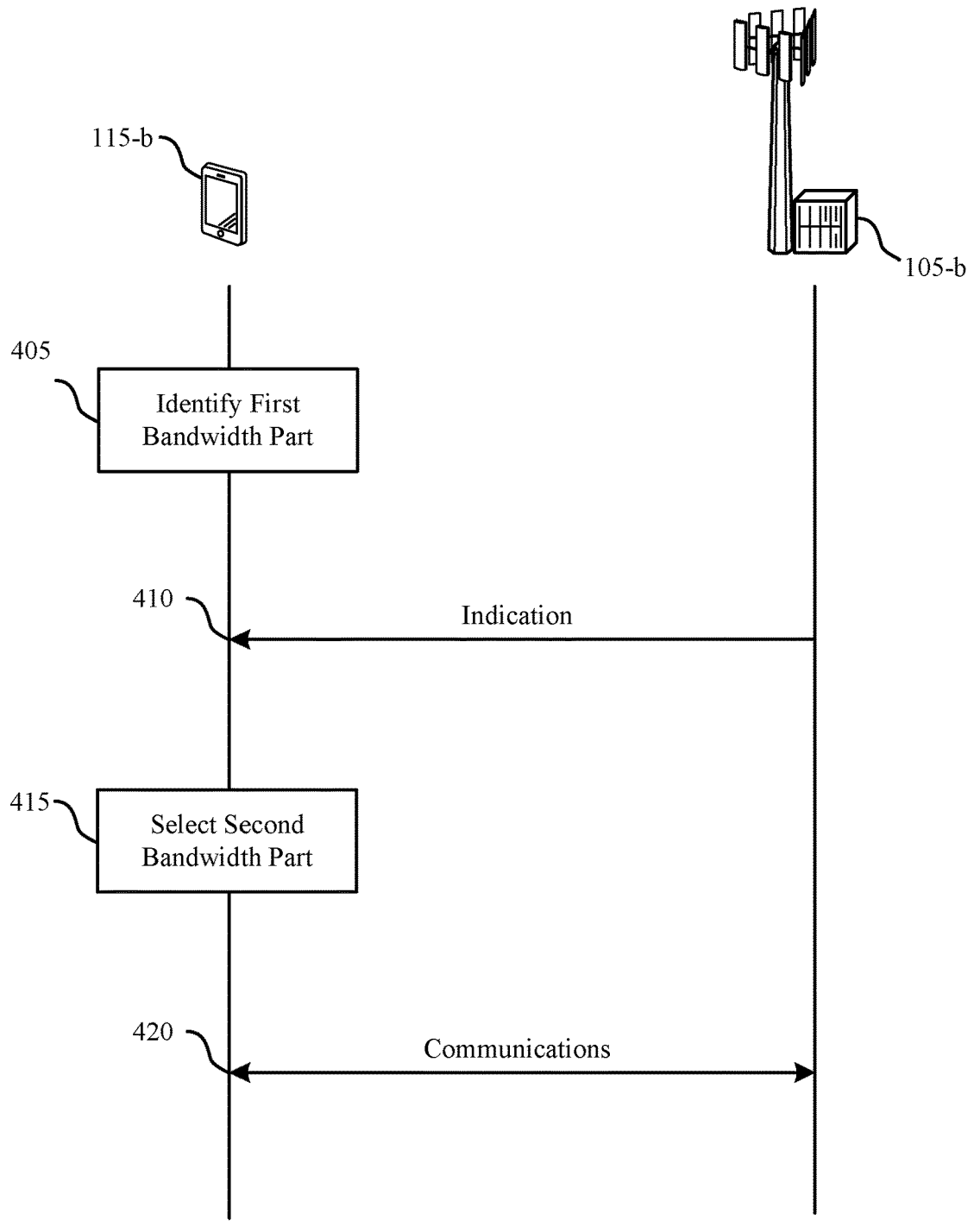
FIG. 4 illustrates an example of a process flow that supports updating a bandwidth part width from a default configuration in accordance with aspects of the present disclosure.

FIG. 4 illustrates an example of a process flow 400 that supports updating a bandwidth part width from a default configuration in accordance with aspects of the present disclosure. In some examples, the process flow 400 may implement aspects of wireless communication system 100. UE 115-*b* and/or base station 105-*b* may support updating a bandwidth part width from a default configuration in accordance with aspects of the present disclosure. Updating a BWP may increase a transmit power and reduce interference. Alternative examples of the following may be implemented, where some steps are performed in a different order than described or are not performed at all. In some cases, steps may include additional features not mentioned below, or further steps may be added.

At 405, UE 115-*b* may identify a first bandwidth part. In some cases, the first bandwidth part may be a default bandwidth part for communication with a base station. In some cases, the first bandwidth part may be preconfigured (e.g., standardized) or obtained through signaling between UE 115-*b* and base station 105-*b*.

At 410, UE 115-*b* may receive an indication of a second bandwidth part that is wider than the first bandwidth part from base station 105-*b*. In some cases, the second indication may be received in or based on an RMSI, an SIB, an SIB-1, an SSB, or an MIB.

At 415, UE 115-*b* may select a second BWP for communications with base station 105-*b*. In some cases, the second BWP may be selected based on the received indication and an operating band of base station 105-*b*. The second BWP may correspond to an initial downlink BWP, and initial uplink BWP, or a bandwidth of a CORESET 0.

At 420, UE 115-*b* and base station 105-*b* may communicate using the second BWP. In some examples, UE 115-*b* communicating with base station 105-*b* may include UE 115-*b* receiving an SIB using the second BWP.

Figure 5:
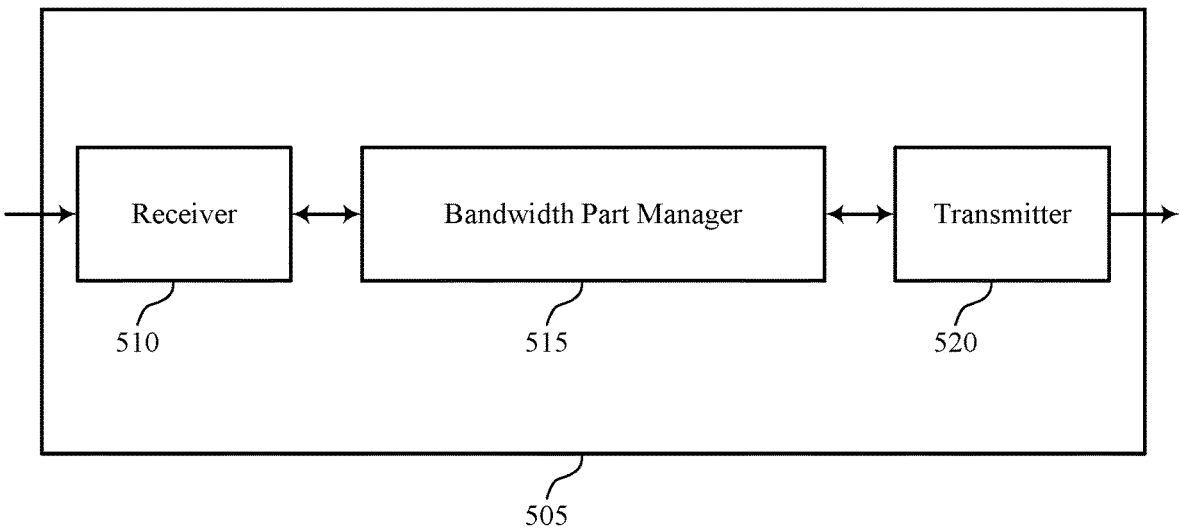
FIGS. 5 and 6 show block diagrams of devices that support updating a bandwidth part width from a default configuration in accordance with aspects of the present disclosure.

FIG. 5 shows a block diagram 500 of a device 505 that supports updating a bandwidth part width from a default configuration in accordance with aspects of the present disclosure. The device 505 may be an example of aspects of a UE 115 as described herein. The device 505 may include a receiver 510, a bandwidth part manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to updating a bandwidth part width from a default configuration, etc.). Information may be passed on to other components of the device 505. The receiver 510 may be an example of aspects of the transceiver 820 described with reference to FIG. 8. The receiver 510 may utilize a single antenna or a set of antennas.

The bandwidth part manager 515 may identify a first bandwidth part, where the first bandwidth part is a default bandwidth part for communication with a base station, receive from the base station an indication of a second bandwidth part that is wider than the first bandwidth part, select, based on the received indication and an operating band of the base station, the second bandwidth part for communications between the UE and the base station, and communicate with the base station using the second bandwidth part. The bandwidth part manager 515 may be an example of aspects of the bandwidth part manager 810 described herein.

The bandwidth part manager 515, or its sub-components, may be implemented in hardware, code (e.g., software or firmware) executed by a processor, or any combination thereof. If implemented in code executed by a processor, the functions of the bandwidth part manager 515, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The bandwidth part manager 515, or its sub-components, may be physically located at various positions, including being distributed such that portions of functions are implemented at different physical locations by one or more physical components. In some examples, the bandwidth part manager 515, or its sub-components, may be a separate and distinct component in accordance with various aspects of the present disclosure. In some examples, the bandwidth part manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas. The bandwidth part manager 515 may improve the link quality between a base station and a UE, reduce signaling between the base station and the UE, and support a higher data throughput.

Figure 6:
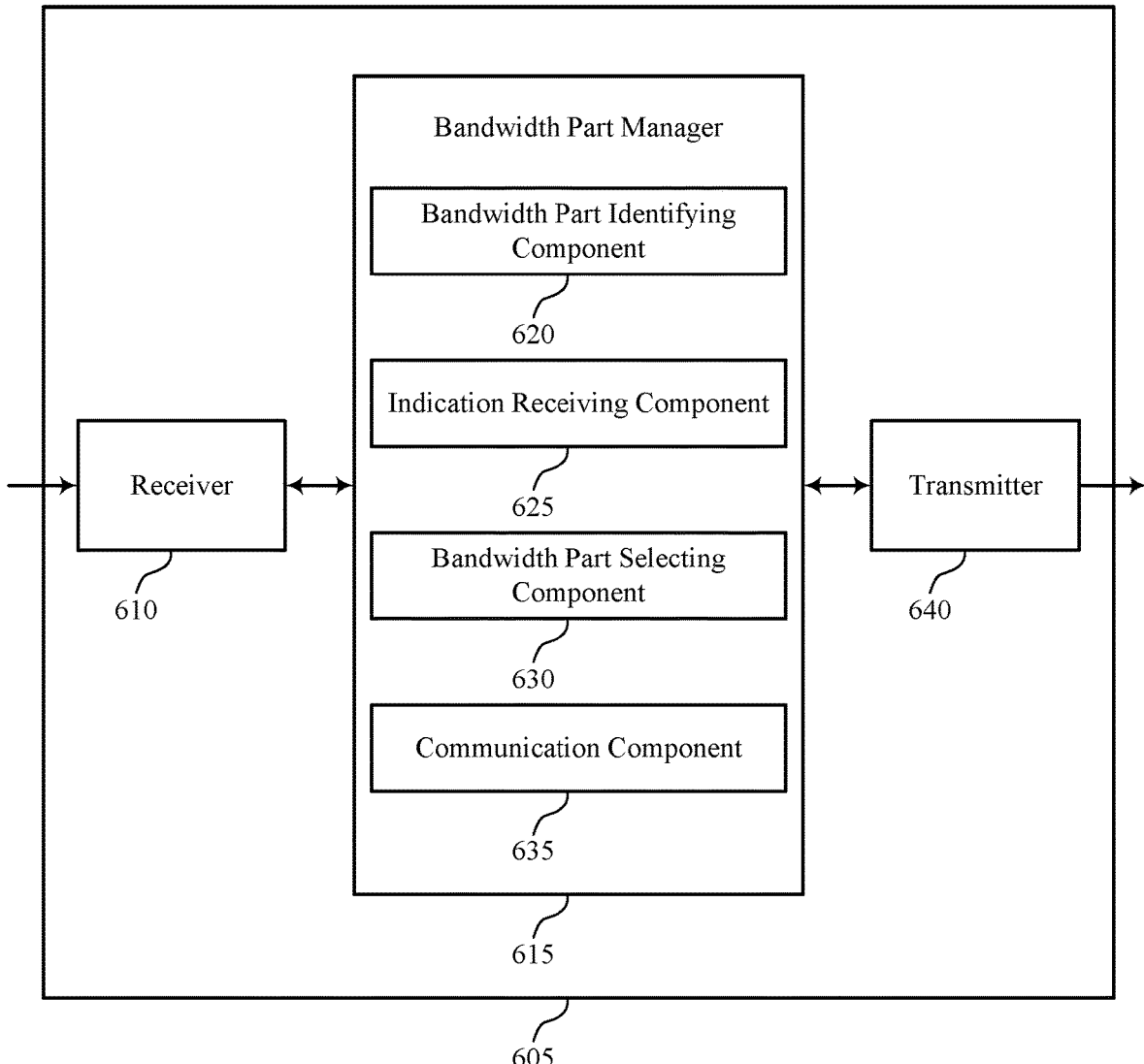

FIG. 6 shows a block diagram 600 of a device 605 that supports updating a bandwidth part width from a default configuration in accordance with aspects of the present disclosure. The device 605 may be an example of aspects of a device 505, or a UE 115 as described herein. The device 605 may include a receiver 610, a bandwidth part manager 615, and a transmitter 640. The device 605 may also include a processor. Each of these components may be in communication with one another (e.g., via one or more buses).

The receiver 610 may receive information such as packets, user data, or control information associated with various information channels (e.g., control channels, data channels, and information related to updating a bandwidth part width from a default configuration, etc.). Information may be passed on to other components of the device 605. The receiver 610 may be an example of aspects of the transceiver 820 described with reference to FIG. 8. The receiver 610 may utilize a single antenna or a set of antennas.

The bandwidth part manager 615 may be an example of aspects of the bandwidth part manager 515 as described herein. The bandwidth part manager 615 may include a bandwidth part identifying component 620, an indication receiving component 625, a bandwidth part selecting component 630, and a communication component 635. The bandwidth part manager 615 may be an example of aspects of the bandwidth part manager 810 described herein.

The bandwidth part identifying component 620 may identify a first bandwidth part, where the first bandwidth part is a default bandwidth part for communication with a base station.

The indication receiving component 625 may receive from the base station an indication of a second bandwidth part that is wider than the first bandwidth part.

The bandwidth part selecting component 630 may select, based on the received indication and an operating band of the base station, the second bandwidth part for communications between the UE and the base station.

The communication component 635 may communicate with the base station using the second bandwidth part.

The transmitter 640 may transmit signals generated by other components of the device 605. In some examples, the transmitter 640 may be collocated with a receiver 610 in a transceiver module. For example, the transmitter 640 may be an example of aspects of the transceiver 820 described with reference to FIG. 8. The transmitter 640 may utilize a single antenna or a set of antennas.

Figure 7:
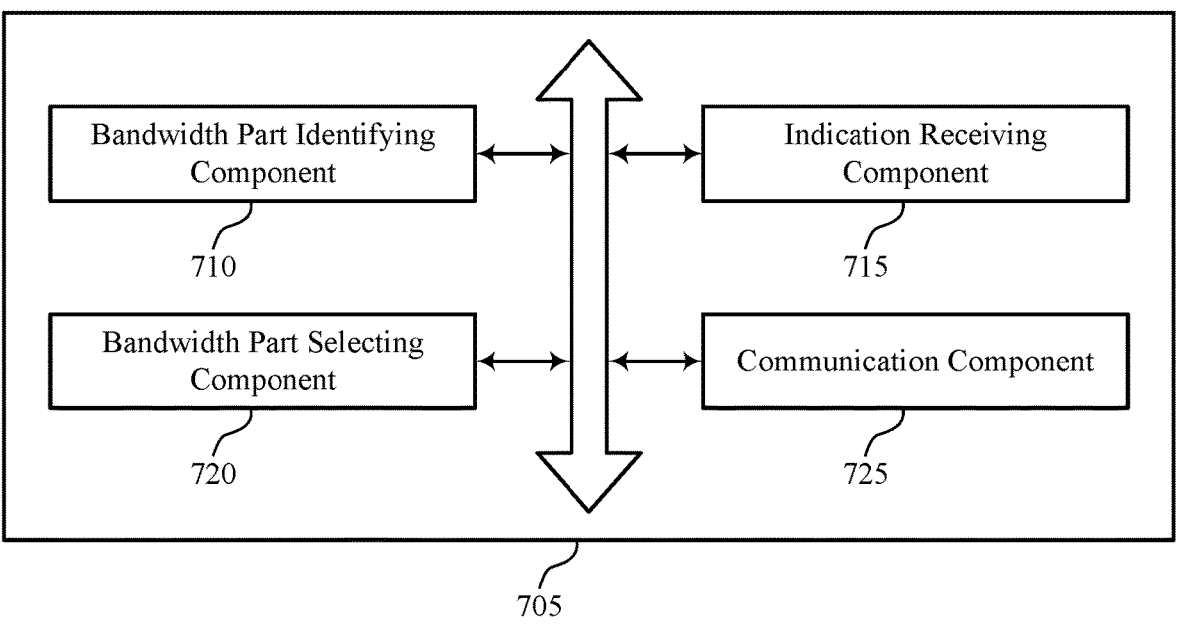
FIG. 7 shows a block diagram of a bandwidth part manager that supports updating a bandwidth part width from a default configuration in accordance with aspects of the present disclosure.

FIG. 7 shows a block diagram 700 of a bandwidth part manager 705 that supports updating a bandwidth part width from a default configuration in accordance with aspects of the present disclosure. The bandwidth part manager 705 may be an example of aspects of a bandwidth part manager 515, a bandwidth part manager 615, or a bandwidth part manager 810 described herein. The bandwidth part manager 705 may include a bandwidth part identifying component 710, an indication receiving component 715, a bandwidth part selecting component 720, and a communication component 725. Each of these modules may communicate, directly or indirectly, with one another (e.g., via one or more buses).

The bandwidth part identifying component 710 may identify a first bandwidth part, where the first bandwidth part is a default bandwidth part for communication with a base station.

The indication receiving component 715 may receive from the base station an indication of a second bandwidth part that is wider than the first bandwidth part. In some examples, the indication receiving component 715 may receive a remaining minimum system information transmission from the base station including the indication of the second bandwidth part.

In some examples, the indication receiving component 715 may receive a master information block from the base station including the indication of the second bandwidth part. In some cases, the indication of the second bandwidth part includes a control resource set bandwidth field indicating a control resource set bandwidth that is wider than the first bandwidth part.

The bandwidth part selecting component 720 may select, based on the received indication and an operating band of the base station, the second bandwidth part for communications between the UE and the base station. In some examples, the bandwidth part selecting component 720 may determine a scaling factor based on the remaining minimum system information transmission.

In some examples, selecting the second bandwidth part includes determining the second bandwidth part based on the scaling factor and the first bandwidth part. In some cases, a center frequency of the first bandwidth part is aligned with a center frequency of the second bandwidth part. In some cases, a width of the second bandwidth part is an odd multiple of a width of the first bandwidth part. In some cases, an uplink bandwidth part, a downlink bandwidth part, or a combination thereof.

The communication component 725 may communicate with the base station using the second bandwidth part. In some examples, the communication component 725 may receive a system information block using the second bandwidth part. In some cases, the operating band of the base station includes a 6 GHz band.

Figure 8:
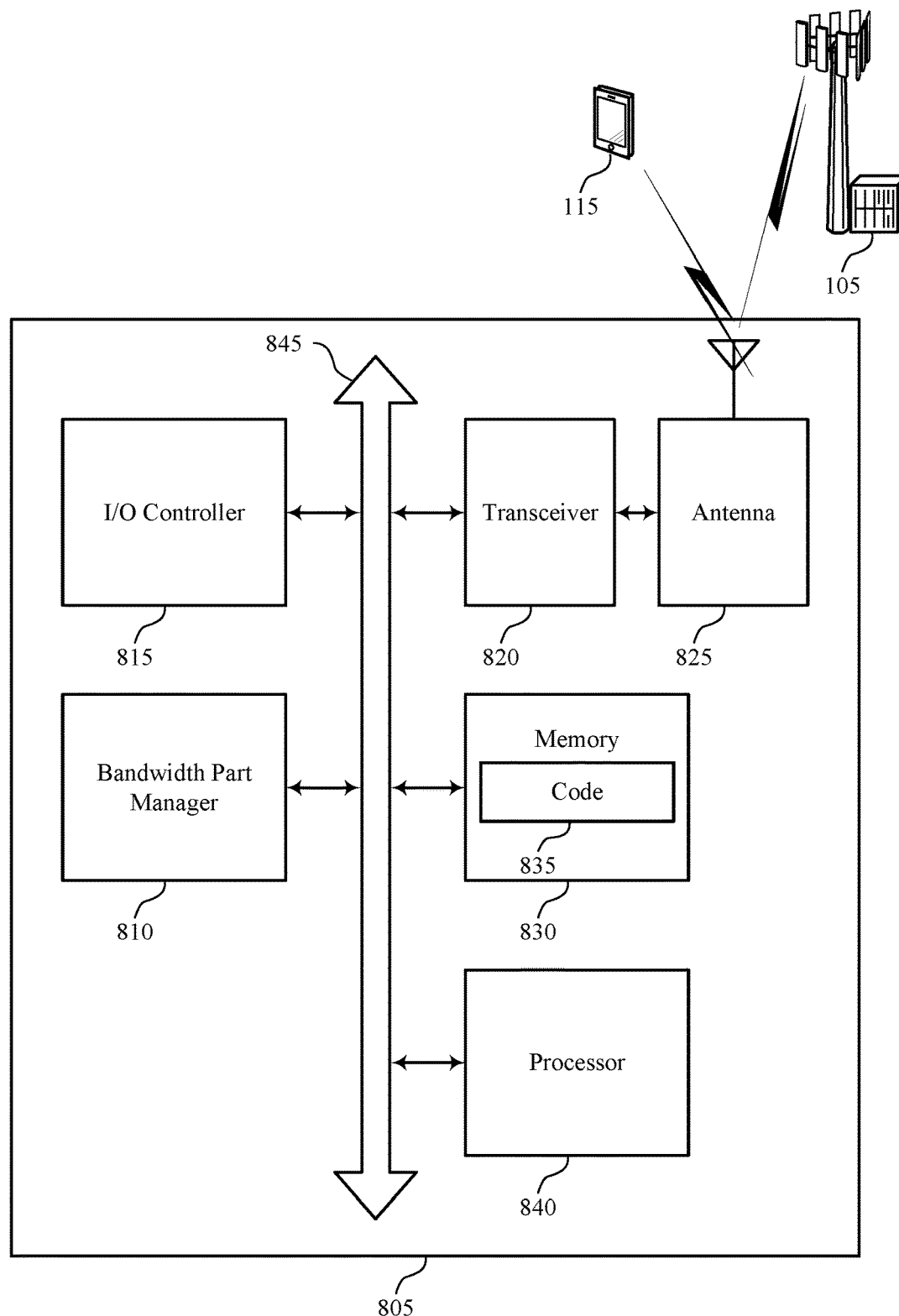
FIG. 8 shows a diagram of a system including a device that supports updating a bandwidth part width from a default configuration in accordance with aspects of the present disclosure.

FIG. 8 shows a diagram of a system 800 including a device 805 that supports updating a bandwidth part width from a default configuration in accordance with aspects of the present disclosure. The device 805 may be an example of or include the components of device 505, device 605, or a UE 115 as described herein. The device 805 may include components for bi-directional voice and data communications including components for transmitting and receiving communications, including a bandwidth part manager 810, an I/O controller 815, a transceiver 820, an antenna 825, memory 830, and a processor 840. These components may be in electronic communication via one or more buses (e.g., bus 845).

The bandwidth part manager 810 may identify a first bandwidth part, where the first bandwidth part is a default bandwidth part for communication with a base station, receive from the base station an indication of a second bandwidth part that is wider than the first bandwidth part, select, based on the received indication and an operating band of the base station, the second bandwidth part for communications between the UE and the base station, and communicate with the base station using the second bandwidth part.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include RAM and ROM. The memory 830 may store computer-readable, computer-executable code 835 including instructions that, when executed, cause the processor to perform various functions described herein. In some cases, the memory 830 may contain, among other things, a BIOS which may control basic hardware or software operation such as the interaction with peripheral components or devices.

The processor 840 may include a programmable hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting updating a bandwidth part width from a default configuration).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein. In some examples, the bandwidth part manager 810 may improve the battery life of a UE. For example, the bandwidth part manager 810 may support the performance of efficient data transmission, thereby improving battery life. The bandwidth part manager 810 may additionally or alternatively reduce system latency and improve user experience.

Figure 9:
FIGS. 9 and 10 show block diagrams of devices that support updating a bandwidth part width from a default configuration in accordance with aspects of the present disclosure.

FIG. 9 shows a block diagram 900 of a device 905 that supports updating a bandwidth part width from a default configuration in accordance with aspects of the present disclosure. The device 905 may be an example of aspects of a base station 105 as described herein. The device 905 may include a receiver 910, a bandwidth part manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to updating a bandwidth part width from a default configuration, etc.). Information may be passed on to other components of the device 905. The receiver 910 may be an example of aspects of the transceiver 1220 described with reference to FIG. 12. The receiver 910 may utilize a single antenna or a set of antennas.

The bandwidth part manager 915 may identify a first bandwidth part, where the first bandwidth part is a default bandwidth part for communication with a UE, select a second bandwidth part that is wider than the first bandwidth part, transmit, to the UE and based on an operating band of the base station, an indication of the second bandwidth part, and communicate with the UE using the second bandwidth part. The bandwidth part manager 915 may be an example of aspects of the bandwidth part manager 1210 described herein.

The bandwidth part manager 915, or its sub-components, may be implemented in hardware, code (e.g., software or firmware) executed by a processor, or any combination thereof. If implemented in code executed by a processor, the functions of the bandwidth part manager 915, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The bandwidth part manager 915, or its sub-components, may be physically located at various positions, including being distributed such that portions of functions are implemented at different physical locations by one or more physical components. In some examples, the bandwidth part manager 915, or its sub-components, may be a separate and distinct component in accordance with various aspects of the present disclosure. In some examples, the bandwidth part manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas. The bandwidth part manager 915 may improve the link quality between a base station and a UE, reduce signaling between the base station and the UE, and support a higher data throughput.

Figure 10:
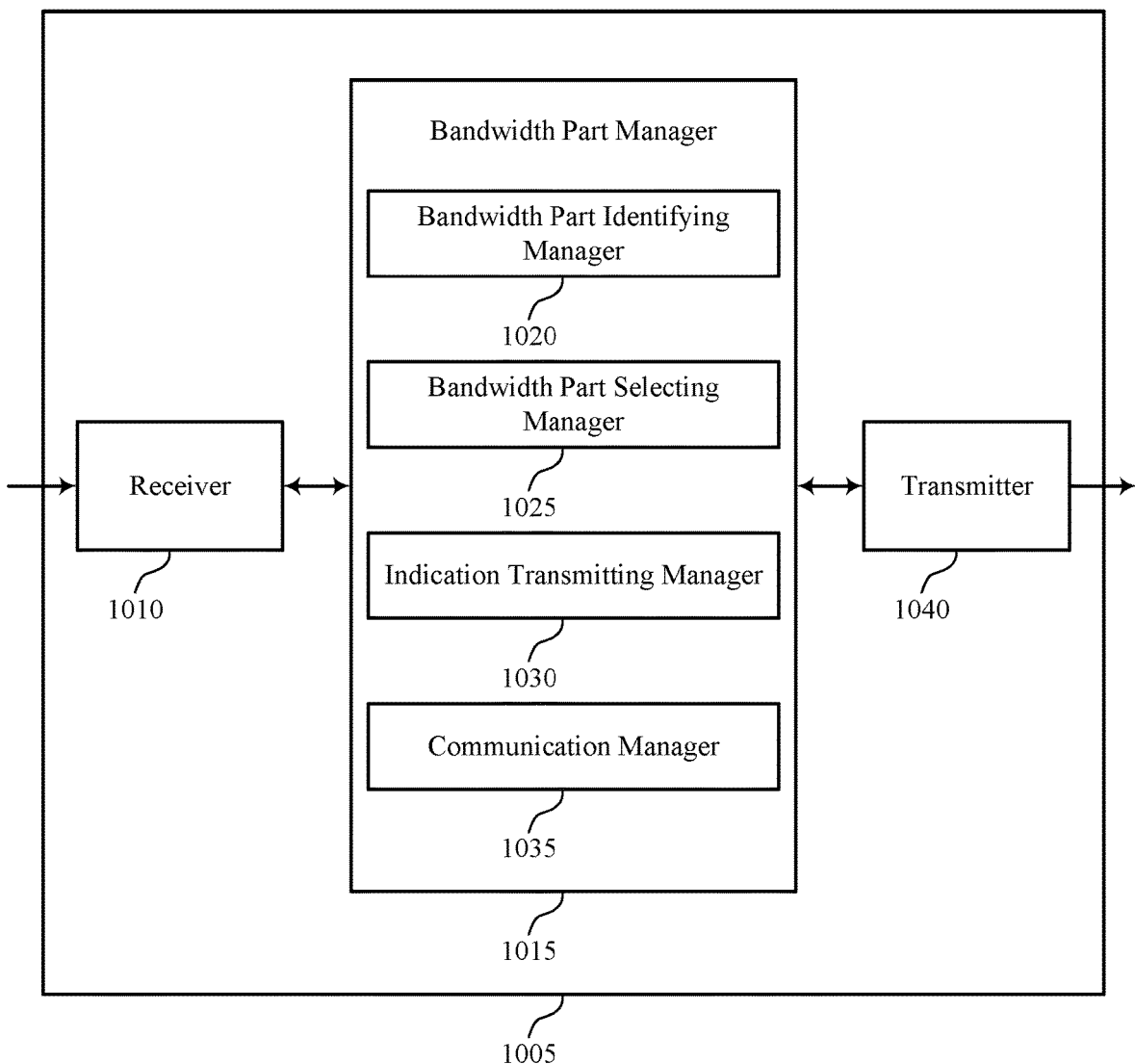

FIG. 10 shows a block diagram 1000 of a device 1005 that supports updating a bandwidth part width from a default configuration in accordance with aspects of the present disclosure. The device 1005 may be an example of aspects of a device 905, or a base station 105 as described herein. The device 1005 may include a receiver 1010, a bandwidth part manager 1015, and a transmitter 1040. The device 1005 may also include a processor. Each of these components may be in communication with one another (e.g., via one or more buses).

The receiver 1010 may receive information such as packets, user data, or control information associated with various information channels (e.g., control channels, data channels, and information related to updating a bandwidth part width from a default configuration, etc.). Information may be passed on to other components of the device 1005. The receiver 1010 may be an example of aspects of the transceiver 1220 described with reference to FIG. 12. The receiver 1010 may utilize a single antenna or a set of antennas.

The bandwidth part manager 1015 may be an example of aspects of the bandwidth part manager 915 as described herein. The bandwidth part manager 1015 may include a bandwidth part identifying manager 1020, a bandwidth part selecting manager 1025, an indication transmitting manager 1030, and a communication manager 1035. The bandwidth part manager 1015 may be an example of aspects of the bandwidth part manager 1210 described herein.

The bandwidth part identifying manager 1020 may identify a first bandwidth part, where the first bandwidth part is a default bandwidth part for communication with a UE. The bandwidth part selecting manager 1025 may select a second bandwidth part that is wider than the first bandwidth part. The indication transmitting manager 1030 may transmit, to the UE and based on an operating band of the base station, an indication of the second bandwidth part. The communication manager 1035 may communicate with the UE using the second bandwidth part.

The transmitter 1040 may transmit signals generated by other components of the device 1005. In some examples, the transmitter 1040 may be collocated with a receiver 1010 in a transceiver module. For example, the transmitter 1040 may be an example of aspects of the transceiver 1220 described with reference to FIG. 12. The transmitter 1040 may utilize a single antenna or a set of antennas.

Figure 11:
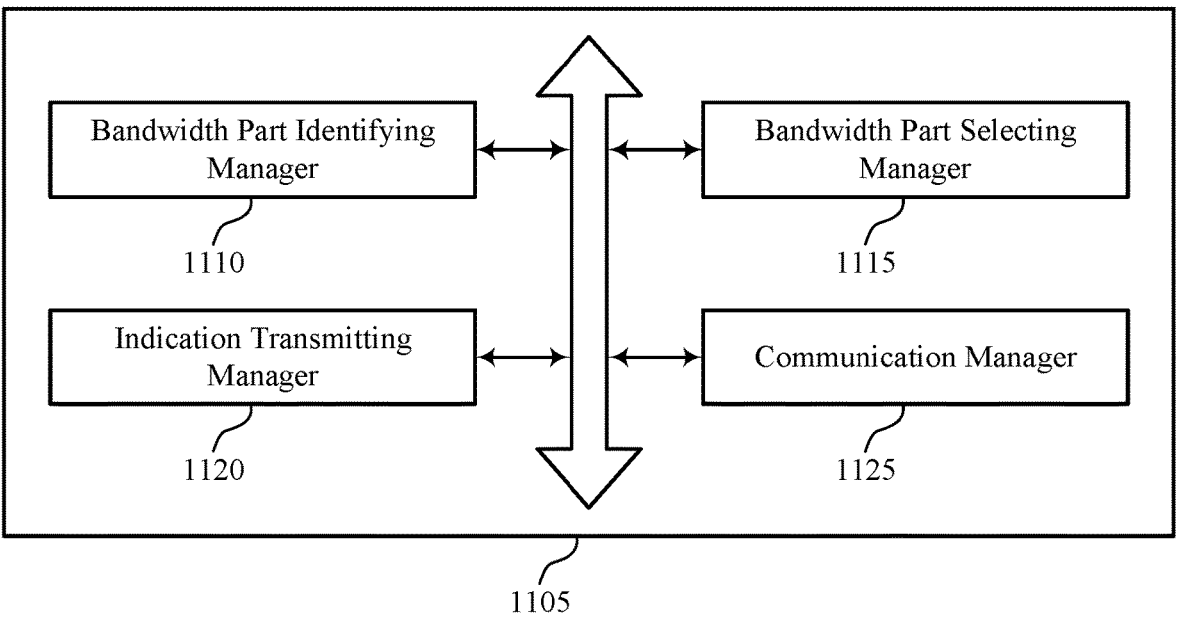
FIG. 11 shows a block diagram of a bandwidth part manager that supports updating a bandwidth part width from a default configuration in accordance with aspects of the present disclosure.

FIG. 11 shows a block diagram 1100 of a bandwidth part manager 1105 that supports updating a bandwidth part width from a default configuration in accordance with aspects of the present disclosure. The bandwidth part manager 1105 may be an example of aspects of a bandwidth part manager 915, a bandwidth part manager 1015, or a bandwidth part manager 1210 described herein. The bandwidth part manager 1105 may include a bandwidth part identifying manager 1110, a bandwidth part selecting manager 1115, an indication transmitting manager 1120, and a communication manager 1125. Each of these modules may communicate, directly or indirectly, with one another (e.g., via one or more buses).

The bandwidth part identifying manager 1110 may identify a first bandwidth part, where the first bandwidth part is a default bandwidth part for communication with a UE. The bandwidth part selecting manager 1115 may select a second bandwidth part that is wider than the first bandwidth part. In some examples, the bandwidth part selecting manager 1115 may determine a scaling factor based on the remaining minimum system information transmission.

In some examples, selecting the second bandwidth part includes determining the second bandwidth part based on the scaling factor and the first bandwidth part. In some cases, a center frequency of the first bandwidth part is aligned with a center frequency of the second bandwidth part. In some cases, a width of the second bandwidth part is an odd multiple of a width of the first bandwidth part. In some cases, an uplink bandwidth part, a downlink bandwidth part, or a combination thereof.

The indication transmitting manager 1120 may transmit, to the UE and based on an operating band of the base station, an indication of the second bandwidth part. In some examples, the indication transmitting manager 1120 may transmit a remaining minimum system information transmission to the UE including the indication of the second bandwidth part. In some examples, the indication transmitting manager 1120 may transmit a master information block to the UE including the indication of the second bandwidth part.

In some cases, the indication of the second bandwidth part includes a control resource set bandwidth field indicating a control resource set bandwidth that is wider than the first bandwidth part. The communication manager 1125 may communicate with the UE using the second bandwidth part. In some examples, the communication manager 1125 may transmit a system information block using the second bandwidth part. In some cases, the operating band of the base station includes a 6 GHz band.

Figure 12:
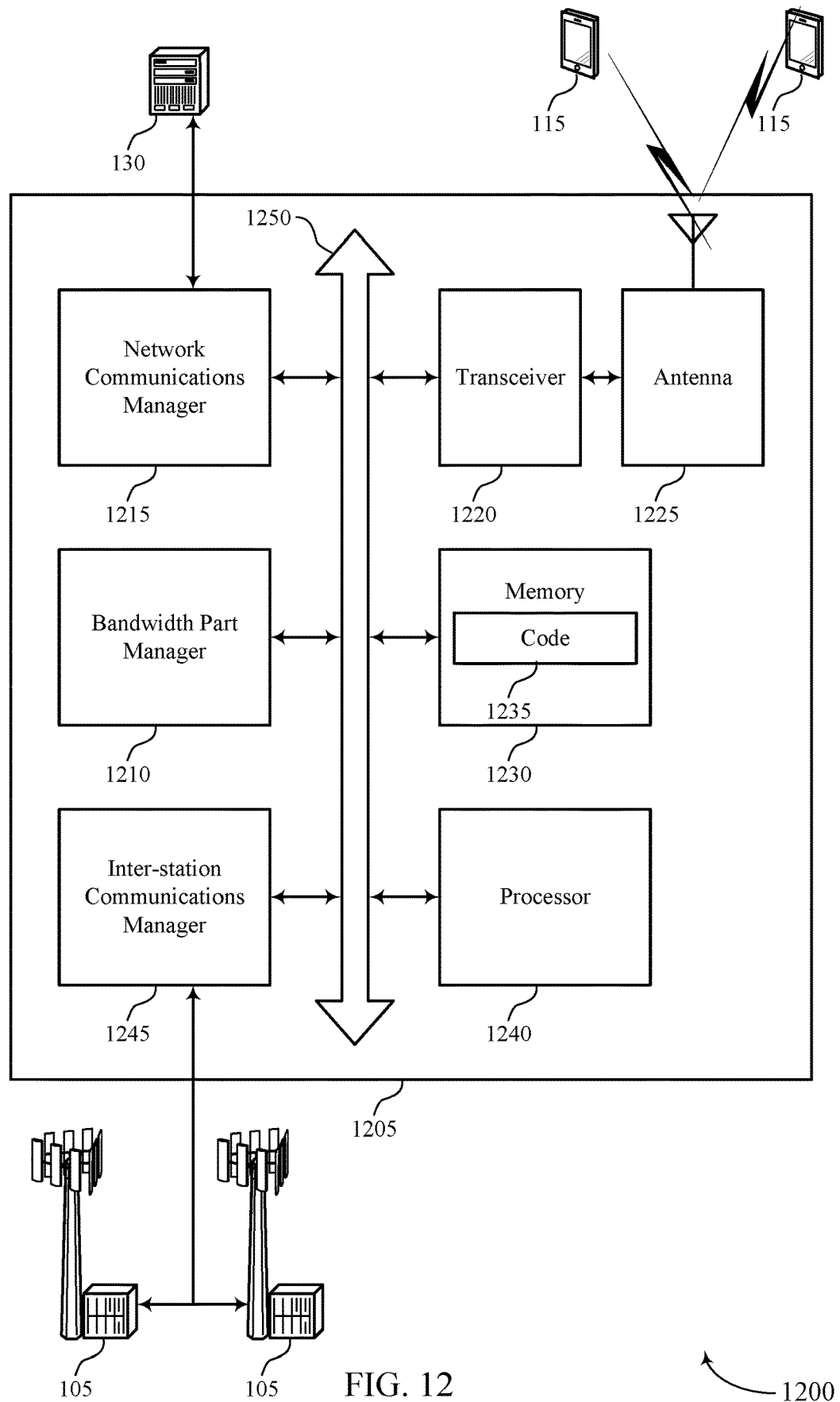
FIG. 12 shows a diagram of a system including a device that supports updating a bandwidth part width from a default configuration in accordance with aspects of the present disclosure.

FIG. 12 shows a diagram of a system 1200 including a device 1205 that supports updating a bandwidth part width from a default configuration in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a bandwidth part manager 1210, a network communications manager 1215, a transceiver 1220, an antenna 1225, memory 1230, a processor 1240, and an inter-station communications manager 1245. These components may be in electronic communication via one or more buses (e.g., bus 1250).

The bandwidth part manager 1210 may identify a first bandwidth part, where the first bandwidth part is a default bandwidth part for communication with a UE, select a second bandwidth part that is wider than the first bandwidth part, transmit, to the UE and based on an operating band of the base station, an indication of the second bandwidth part, and communicate with the UE using the second bandwidth part.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting updating a bandwidth part width from a default configuration).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein. In some examples, the bandwidth part manager 1210 may improve the battery life of a UE. For example, the bandwidth part manager 1210 may support the performance of efficient data transmission, thereby improving battery life. The bandwidth part manager 1210 may additionally or alternatively reduce system latency and improve user experience.

FIG. 13 shows a flowchart illustrating a method 1300 that supports updating a bandwidth part width from a default configuration in accordance with aspects of the present disclosure. The operations of method 1300 may be implemented by a UE 115 or its components as described herein. For example, the operations of method 1300 may be performed by a bandwidth part manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1305, the UE may identify a first bandwidth part, where the first bandwidth part is a default bandwidth part for communication with a base station. The operations of 1305 may be performed according to the methods described herein. In some examples, aspects of the operations of 1305 may be performed by a bandwidth part identifying component as described with reference to FIGS. 5 through 8.

At 1310, the UE may receive from the base station an indication of a second bandwidth part that is wider than the first bandwidth part. The operations of 1310 may be performed according to the methods described herein. In some examples, aspects of the operations of 1310 may be performed by an indication receiving component as described with reference to FIGS. 5 through 8.

At 1315, the UE may select, based on the received indication and an operating band of the base station, the second bandwidth part for communications between the UE and the base station. The operations of 1315 may be performed according to the methods described herein. In some examples, aspects of the operations of 1315 may be performed by a bandwidth part selecting component as described with reference to FIGS. 5 through 8.

At 1320, the UE may communicate with the base station using the second bandwidth part. The operations of 1320 may be performed according to the methods described herein. In some examples, aspects of the operations of 1320 may be performed by a communication component as described with reference to FIGS. 5 through 8.

FIG. 14 shows a flowchart illustrating a method 1400 that supports updating a bandwidth part width from a default configuration in accordance with aspects of the present disclosure. The operations of method 1400 may be implemented by a UE 115 or its components as described herein. For example, the operations of method 1400 may be performed by a bandwidth part manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1405, the UE may identify a first bandwidth part, where the first bandwidth part is a default bandwidth part for communication with a base station. The operations of 1405 may be performed according to the methods described herein. In some examples, aspects of the operations of 1405 may be performed by a bandwidth part identifying component as described with reference to FIGS. 5 through 8.

At 1410, the UE may receive from the base station an indication of a second bandwidth part that is wider than the first bandwidth part. The operations of 1410 may be performed according to the methods described herein. In some examples, aspects of the operations of 1410 may be performed by an indication receiving component as described with reference to FIGS. 5 through 8.

At 1415, the UE may select, based on the received indication and an operating band of the base station, the second bandwidth part for communications between the UE and the base station. The operations of 1415 may be performed according to the methods described herein. In some examples, aspects of the operations of 1415 may be performed by a bandwidth part selecting component as described with reference to FIGS. 5 through 8.

At 1420, the UE may communicate with the base station using the second bandwidth part. The operations of 1420 may be performed according to the methods described herein. In some examples, aspects of the operations of 1420 may be performed by a communication component as described with reference to FIGS. 5 through 8.

At 1425, the UE may receive a remaining minimum system information transmission from the base station including the indication of the second bandwidth part. The operations of 1425 may be performed according to the methods described herein. In some examples, aspects of the operations of 1425 may be performed by an indication receiving component as described with reference to FIGS. 5 through 8.

At 1430, the UE may determine a scaling factor based on the remaining minimum system information transmission. The operations of 1430 may be performed according to the methods described herein. In some examples, aspects of the operations of 1430 may be performed by a bandwidth part selecting component as described with reference to FIGS. 5 through 8.

At 1435, the UE may determine the second bandwidth part based on the scaling factor and the first bandwidth part. The operations of 1435 may be performed according to the methods described herein. In some examples, aspects of the operations of 1435 may be performed by a bandwidth part selecting component as described with reference to FIGS. 5 through 8.

FIG. 15 shows a flowchart illustrating a method 1500 that supports updating a bandwidth part width from a default configuration in accordance with aspects of the present disclosure. The operations of method 1500 may be implemented by a UE 115 or its components as described herein. For example, the operations of method 1500 may be performed by a bandwidth part manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1505, the UE may identify a first bandwidth part, where the first bandwidth part is a default bandwidth part for communication with a base station. The operations of 1505 may be performed according to the methods described herein. In some examples, aspects of the operations of 1505 may be performed by a bandwidth part identifying component as described with reference to FIGS. 5 through 8.

At 1510, the UE may receive from the base station an indication of a second bandwidth part that is wider than the first bandwidth part. The operations of 1510 may be performed according to the methods described herein. In some examples, aspects of the operations of 1510 may be performed by an indication receiving component as described with reference to FIGS. 5 through 8.

At 1515, the UE may select, based on the received indication and an operating band of the base station, the second bandwidth part for communications between the UE and the base station. The operations of 1515 may be performed according to the methods described herein. In some examples, aspects of the operations of 1515 may be performed by a bandwidth part selecting component as described with reference to FIGS. 5 through 8.

At 1520, the UE may communicate with the base station using the second bandwidth part. The operations of 1520 may be performed according to the methods described herein. In some examples, aspects of the operations of 1520 may be performed by a communication component as described with reference to FIGS. 5 through 8.

At 1525, the UE may receive a master information block from the base station including the indication of the second bandwidth part. The operations of 1525 may be performed according to the methods described herein. In some examples, aspects of the operations of 1525 may be performed by an indication receiving component as described with reference to FIGS. 5 through 8.

At 1530, the UE may receive a system information block using the second bandwidth part. The operations of 1535 may be performed according to the methods described herein. In some examples, aspects of the operations of 1535 may be performed by a communication component as described with reference to FIGS. 5 through 8.

FIG. 16 shows a flowchart illustrating a method 1600 that supports updating a bandwidth part width from a default configuration in accordance with aspects of the present disclosure. The operations of method 1600 may be implemented by a base station 105 or its components as described herein. For example, the operations of method 1600 may be performed by a bandwidth part manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1605, the base station may identify a first bandwidth part, where the first bandwidth part is a default bandwidth part for communication with a UE. The operations of 1605 may be performed according to the methods described herein. In some examples, aspects of the operations of 1605 may be performed by a bandwidth part identifying manager as described with reference to FIGS. 9 through 12.

At 1610, the base station may select a second bandwidth part that is wider than the first bandwidth part. The operations of 1610 may be performed according to the methods described herein. In some examples, aspects of the operations of 1610 may be performed by a bandwidth part selecting manager as described with reference to FIGS. 9 through 12.

At 1615, the base station may transmit, to the UE and based on an operating band of the base station, an indication of the second bandwidth part. The operations of 1615 may be performed according to the methods described herein. In some examples, aspects of the operations of 1615 may be performed by an indication transmitting manager as described with reference to FIGS. 9 through 12.

At 1620, the base station may communicate with the UE using the second bandwidth part. The operations of 1620 may be performed according to the methods described herein. In some examples, aspects of the operations of 1620 may be performed by a communication manager as described with reference to FIGS. 9 through 12.

FIG. 17 shows a flowchart illustrating a method 1700 that supports updating a bandwidth part width from a default configuration in accordance with aspects of the present disclosure. The operations of method 1700 may be implemented by a base station 105 or its components as described herein. For example, the operations of method 1700 may be performed by a bandwidth part manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1705, the base station may identify a first bandwidth part, where the first bandwidth part is a default bandwidth part for communication with a UE. The operations of 1705 may be performed according to the methods described herein. In some examples, aspects of the operations of 1705 may be performed by a bandwidth part identifying manager as described with reference to FIGS. 9 through 12.

At 1710, the base station may select a second bandwidth part that is wider than the first bandwidth part. The operations of 1710 may be performed according to the methods described herein. In some examples, aspects of the operations of 1710 may be performed by a bandwidth part selecting manager as described with reference to FIGS. 9 through 12.

At 1715, the base station may transmit, to the UE and based on an operating band of the base station, an indication of the second bandwidth part. The operations of 1715 may be performed according to the methods described herein. In some examples, aspects of the operations of 1715 may be performed by an indication transmitting manager as described with reference to FIGS. 9 through 12.

At 1720, the base station may communicate with the UE using the second bandwidth part. The operations of 1720 may be performed according to the methods described herein. In some examples, aspects of the operations of 1720 may be performed by a communication manager as described with reference to FIGS. 9 through 12.

At 1725, the base station may transmit a remaining minimum system information transmission to the UE including the indication of the second bandwidth part. The operations of 1725 may be performed according to the methods described herein. In some examples, aspects of the operations of 1725 may be performed by an indication transmitting manager as described with reference to FIGS. 9 through 12.

At 1730, the base station may determine a scaling factor based on the remaining minimum system information transmission. The operations of 1730 may be performed according to the methods described herein. In some examples, aspects of the operations of 1730 may be performed by a bandwidth part selecting manager as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   identifying a first bandwidth part, wherein the first bandwidth part is a default bandwidth part for communication with a network entity;
   receiving, from the network entity, an indication of a second bandwidth part that is wider than the first bandwidth part;
   selecting, based at least in part on the received indication, an operating band of the network entity, a scaling factor, and the first bandwidth part, the second bandwidth part for communications between the UE and the network entity; and
   communicating with the network entity using the second bandwidth part.

2. The method of claim 1, wherein receiving the indication of the second bandwidth part comprises:
   receiving a remaining minimum system information transmission from the network entity comprising the indication of the second bandwidth part.

3. The method of claim 2, further comprising:
   determining the scaling factor based at least in part on the remaining minimum system information transmission.

4. The method of claim 3, wherein a center frequency of the first bandwidth part is aligned with a center frequency of the second bandwidth part.

5. The method of claim 3, wherein a width of the second bandwidth part is an odd multiple of a width of the first bandwidth part.

6. A method for wireless communication at a network entity, comprising:
   identifying a first bandwidth part, wherein the first bandwidth part is a default bandwidth part for communication with a user equipment (UE);
   selecting a second bandwidth part that is wider than the first bandwidth part;
   transmitting, to the UE and based at least in part on an operating band of the network entity, a scaling factor, and the first bandwidth part, an indication of the second bandwidth part; and
   communicating with the UE using the second bandwidth part.

7. The method of claim 6, wherein transmitting the indication of the second bandwidth part comprises:
   transmitting a remaining minimum system information transmission to the UE comprising the indication of the second bandwidth part.

8. The method of claim 7, further comprising:
   determining the scaling factor based at least in part on the remaining minimum system information transmission.

9. The method of claim 8, wherein a center frequency of the first bandwidth part is aligned with a center frequency of the second bandwidth part.

10. The method of claim 8, wherein a width of the second bandwidth part is an odd multiple of a width of the first bandwidth part.

11. The method of claim 6, wherein the second bandwidth part comprises one or more of: an uplink bandwidth part, a downlink bandwidth part, or a combination thereof.

12. An apparatus for wireless communication at a user equipment (UE), comprising:

one or more processors, one or more memories coupled with the one or more processors; and instructions stored in the one or more memories and executable by the one or more processors to cause the apparatus to:

identify a first bandwidth part, wherein the first bandwidth part is a default bandwidth part for communication with a network entity;

receive, from the network entity, an indication of a second bandwidth part that is wider than the first bandwidth part;

select, based at least in part on the received indication, an operating band of the network entity, a scaling factor, and the first bandwidth part, the second bandwidth part for communications between the UE and the network entity; and communicate with the network entity using the second bandwidth part.

13. The apparatus of claim 12, wherein the instructions to receive the indication of the second bandwidth part are executable by the one or more processors to cause the apparatus to:

receive a remaining minimum system information transmission from the network entity comprising the indication of the second bandwidth part.

14. The apparatus of claim 13, wherein the instructions are further executable by the one or more processors to cause the apparatus to:

determine the scaling factor based at least in part on the remaining minimum system information transmission.

15. The apparatus of claim 14, wherein a center frequency of the first bandwidth part is aligned with a center frequency of the second bandwidth part.

16. The apparatus of claim 14, wherein a width of the second bandwidth part is an odd multiple of a width of the first bandwidth part.

17. The apparatus of claim 12, wherein the second bandwidth part comprises one or more of: comprises an uplink bandwidth part, a downlink bandwidth part, or a combination thereof.

18. The apparatus of claim 12, wherein the instructions to receive the indication of the second bandwidth part are executable by the one or more processors to cause the apparatus to:

receive a master information block from the network entity comprising the indication of the second bandwidth part.

19. The apparatus of claim 18, wherein the indication of the second bandwidth part comprises a control resource set bandwidth field indicating a control resource set bandwidth that is wider than the first bandwidth part.

20. The apparatus of claim 18, wherein the instructions to communicate with the network entity using the second bandwidth part are executable by the one or more processors to cause the apparatus to:

receive a system information block using the second bandwidth part.

21. The apparatus of claim 12, wherein the operating band of the network entity comprises a 6 GHz band.

22. An apparatus for wireless communication at a network entity, comprising:

one or more processors, one or more memories coupled with the one or more processors; and instructions stored in the one or more memories and executable by the one or more processors to cause the apparatus to:

identify a first bandwidth part, wherein the first bandwidth part is a default bandwidth part for communication with a user equipment (UE);

select a second bandwidth part that is wider than the first bandwidth part;

transmit, to the UE and based at least in part on an operating band of the network entity, a scaling factor, and the first bandwidth part, an indication of the second bandwidth part; and communicate with the UE using the second bandwidth part.

23. The apparatus of claim 22, wherein the instructions to transmit the indication of the second bandwidth part are executable by the one or more processors to cause the apparatus to:

transmit a remaining minimum system information transmission to the UE comprising the indication of the second bandwidth part.

24. The apparatus of claim 23, wherein the instructions are further executable by the one or more processors to cause the apparatus to:

determine the scaling factor based at least in part on the remaining minimum system information transmission.

25. The apparatus of claim 24, wherein a center frequency of the first bandwidth part is aligned with a center frequency of the second bandwidth part.

26. The apparatus of claim 24, wherein a width of the second bandwidth part is an odd multiple of a width of the first bandwidth part.

27. The apparatus of claim 22, wherein the second bandwidth part comprises one or more of: comprises an uplink bandwidth part, a downlink bandwidth part, or a combination thereof.

28. The apparatus of claim 22, wherein the instructions to transmit the indication of the second bandwidth part are executable by the one or more processors to cause the apparatus to:

transmit a master information block to the UE comprising the indication of the second bandwidth part.

29. The apparatus of claim 28, wherein the indication of the second bandwidth part comprises a control resource set bandwidth field indicating a control resource set bandwidth that is wider than the first bandwidth part.

30. The apparatus of claim 28, wherein the instructions to communicate with the UE using the second bandwidth part are executable by the one or more processors to cause the apparatus to:

transmit a system information block using the second bandwidth part.

* * * * *